United States Patent [19]

Obara et al.

[11] 4,276,602
[45] Jun. 30, 1981

[54] ELECTRONIC ENGINE CONTROL APPARATUS HAVING ARRANGEMENT FOR VARYING FUEL INJECTION DURATION

[75] Inventors: Sanshiro Obara; Hiroatsu Tokuda; Akihiko Konno, all of Ibaraki; Hideo Nakamura, Tokyo, all of Japan

[73] Assignee: Hitachi, Ltd., Tokyo, Japan

[21] Appl. No.: 59,029

[22] Filed: Jul. 19, 1979

[30] Foreign Application Priority Data

Aug. 7, 1978 [JP] Japan .................................. 53-95483

[51] Int. Cl.³ ............................ F02D 5/00; F02P 5/04; G05B 15/02
[52] U.S. Cl. ..................................... 364/431; 123/417; 123/480; 123/487
[58] Field of Search ........................ 364/424, 431, 442; 340/347 DD, 347 DA; 123/416, 417, 480, 486, 487, 488

[56] References Cited

U.S. PATENT DOCUMENTS

| | | |
|---|---|---|
| 3,755,805 | 8/1973 | Candiani ...................... 340/347 DD |
| 3,778,605 | 12/1973 | Montgomery ........... 340/347 DD X |
| 3,863,248 | 1/1975 | Deschenes et al. .......... 340/347 DD |
| 3,906,207 | 9/1975 | Rivere et al. ......................... 364/431 |
| 3,969,614 | 7/1976 | Moyer et al. ......................... 364/431 |
| 4,058,807 | 11/1977 | Yamazaki ...................... 340/347 DA |
| 4,099,495 | 7/1978 | Kiencke et al. ....................... 364/442 |

FOREIGN PATENT DOCUMENTS 2845350  4/1979  Fed. Rep. of Germany ..... 123/32 EA

OTHER PUBLICATIONS

Degryse et al., A Logarithmic Transcoder IEEE Transactions on Computers vol. C-21, No. 11, Nov. 1972, pp. 1165-1168.

Primary Examiner—Felix D. Gruber
Attorney, Agent, or Firm—Craig & Antonelli

[57] ABSTRACT

An electronic control apparatus for an internal combustion engine having engine sensors, actuators, and a signal processor, contains an improved interface unit for coupling signals to the actuators in response to an output from the processor based upon sensor signals. The interface unit includes a scheme for generating event timing signals in accordance with the prescribed timing signal pattern generated by a stage pulse generator. Depending upon the operational conditions of the engine, the processor supplies a control code through which the timing signals that are produced are altered. This control code is used to alter the rate of occurrence or frequency of generation of the timing signals so that specific actuator control functions may be varied depending upon the engine operation conditions.

45 Claims, 14 Drawing Figures

ELECTRONIC ENGINE CONTROL APPARATUS HAVING ARRANGEMENT FOR VARYING FUEL INJECTION DURATION

CROSS REFERENCES TO RELATED APPLICATION

The present invention relates to subject matter described in the following co-pending applications:

| USSN: 943,930 | Filed: September 20, 1978 | Hiroastu Tokuda et al |
|---|---|---|
| USSN: 951,509 | Filed: October 16, 1978 | Shigeki Morinaga et al |
| USSN: 952,275 | Filed: October 18, 1978 | Masao Takato et al |
| USSN: 952,276 | Filed: October 18, 1978 | Hiroastu Tokuda et al |
| USSN: 952,279 | Filed: October 18, 1978 | Hiroastu Tokuda et al |
| USSN: 952,326 | Filed: October 18, 1978 | Masumi Imai et al |
| USSN: 952,531 | Filed: October 18, 1978 | Masumi Imai et al |
| USSN: 952,532 | Filed: October 18, 1978 | Hiroastu Tokuda et al |
| USSN: 952,533 | Filed: October 18, 1978 | Masumi Imai et al |
| USSN: 011,845 | Filed: February 13, 1979 | Toshio Furuhashi et al |
| USSN: 060,751 | Filed: July 26, 1979 | Toshio Furuhashi et al |
| USSN: 064,431 | Filed: August 7, 1979 | Toshio Furuhashi |
| USSN: 073,085 | Filed: September 6, 1979 | Masumi Imai et al |

BACKGROUND OF THE INVENTION

This invention relates to an electronic control apparatus for an internal combustion engine, and more particularly to a control apparatus for an internal combustion engine for automobiles.

As the demand for automobiles has increased as popular means of transportation, various social problems have occurred. Among them are air pollution and the consumption of petroleum.

In recent years, countermeasures against exhaust gases have been vigorously promoted. On account of these countermeasures, however, the combined efficiency of an internal combustion engine (hereinbelow, termed "engine") has suffered. From the viewpoint of suppressing a decrease in the operating efficiency of the engine and further enhancing countermeasures against exhaust gases, an attempt to enhance control precision by adopting an electronic control system has been effected. For example, a fuel injection system and an ignition timing control system of the electronic control type have been developed. Further, an ignition timing control system employing a microprocessor has recently been developed.

The tendency of prior-art control systems has been to replace mechanical controls with electric controls. Accordingly, electronic control devices for individual controlled systems have been fabricated.

In order to effect exhaust gas-countermeasures and the efficient operation of the engine, it is necessary to comprehensively control the engine. The apparatus as mentioned above, wherein the engine controls are made independent of one another and the respective control circuits fabricated for the independent controlled systems are put together, has lacked integration of the controlled systems and has required delicate control.

SUMMARY OF THE INVENTION

An object of this invention is to provide electronic engine control apparatus capable of controlling an actuator the operation of which must vary over a wide range in dependence on the rotational speed of the engine.

DETAILED DESCRIPTION OF THE INVENTION

Figure 1:
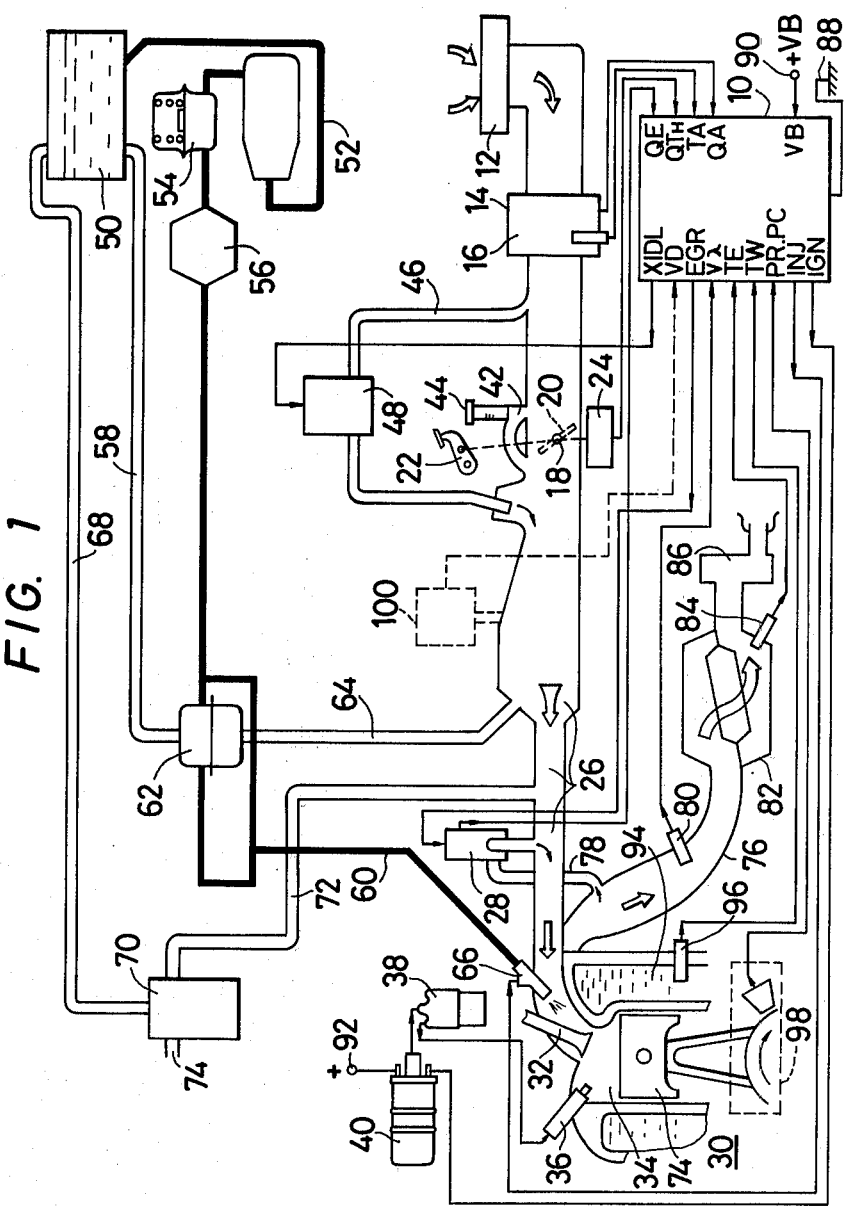
FIG. 1 is a schematic diagram of an arrangement of sensors and actuators in an embodiment of this invention.

Now, an embodiment of this invention will be described with reference to the drawings. FIG. 1 is a system diagram showing the principal construction of electronic engine control apparatus. Air taken in through an air cleaner 12 has its flow rate measured by an air flow meter 14, and an output QA representative of the air flow is applied from the air flow meter 14 to a control circuit 10. The air flow meter 14 is provided with a suction temperature sensor 16 for detecting the temperature of the suction air, and an output TA representative of the temperature of the suction air is applied to the control circuit 10.

The air having passed through the air flow meter 14 passes through a throttle chamber 18, and is sucked or drawn in from an intake manifold 26 through a suction valve 32 into a combustion chamber 34 of an engine 30. The quantity of the air to be drawn into the combustion chamber 34 is controlled by changing the opening of a throttle valve 20 disposed within the throttle chamber in mechanical interlocking relationship with an accelerator pedal 22. The opening of the throttle valve 20 is obtained in such a way that the position of the throttle valve 20 is detected by a throttle position detector 24. A signal QTH representative of the position of the throttle valve 20 is applied from the throttle position detector 24 to the control circuit 10.

The throttle chamber 18 is provided with a bypass passage 42 for idling, and an idle adjust screw 44 for adjusting the quantity of air to pass through the bypass passage 42. In case where the engine is being operated in the idling state, the throttle valve 20 lies in the fully-closed state. The suction air from the air flow meter 14 flows through the bypass passage 42, and is drawn into the combustion chamber 34. Accordingly, the quantity of suction air in the idling operation state can be varied by adjusting the idle adjust screw. Since energy to be generated in the combustion chamber is substantially determined by the quantity of air from the bypass passage 42, the engine revolution speed in the idling operation state can be adjusted to an appropriate value by adjusting the idle adjust screw 44 and thus varying the quantity of suction air into the engine.

The throttle chamber 18 is further provided with another bypass passage 46 and an air regulator 48. The air regulator 48 controls the quantity of air flowing through the passage 46 in response to an output signal NIDL of the control circuit 10, to effect the control of the engine revolution speed during the warm-up operation and the supply of an appropriate quantity of air into the engine at an abrupt change of the throttle valve 20. If necessary, it can also vary the flow rate of air during the idling operation.

Now, the fuel supply system will be explained. Fuel stored in a fuel tank 50 is drawn from tank 50 by a fuel pump 52, and is pumped into a fuel damper 54. The fuel damper 54 absorbs the pressure pulsation of the fuel from the fuel pump 52, and feeds fuel under a predetermined pressure to a fuel pressure regulator 62 through a fuel filter 56. Fuel from the fuel pressure regulator is fed under pressure to a fuel injector 66 through a fuel pipe 60. In response to an output INJ from the control circuit 10, the fuel injector 66 is opened to inject the fuel.

The quantity of fuel injected from the fuel injector 66 is determined by the valve opening time of this injector 66, and the difference between the pressure of the fuel fed to the injector and the pressure of the intake manifold 26 to be injected with the fuel. It is desirable, however, that the quantity of fuel injected from the fuel injector 66 depend only on the valve opening time which is determined by the signal from the control circuit 10. The pressure of the fuel to be fed under pressure to the fuel injector 66 is therefore controlled by the fuel pressure regulator 62 so that the difference between the fuel pressure to the fuel injector 66 and the manifold pressure of the intake manifold 26 may be constant at all times. The intake manifold pressure is applied to the fuel pressure regulator 62 through a pressure conduit 64. When the fuel pressure within the fuel pipe 60 has exceeded this manifold pressure a certain value, the fuel pipe 60 and a fuel return pipe 58 come into communication, and fuel corresponding to the excess pressure is returned to the fuel tank 50 through the fuel return pipe 58. In this way, the difference between the fuel pressure within the fuel pipe 60 and the manifold pressure within the intake manifold 26 is always held constant.

The fuel tank 50 is further provided with a pipe 68 and a canister 70 for absorbing a gas into which the fuel has vaporized. During the operation of the engine, air is drawn from an atmospheric air port 74, and the absorbed vaporized fuel is led by a pipe 72 to the intake manifold 26 and then to the engine 30.

As explained above, the fuel is injected from the fuel injector, the suction valve 32 is opened in synchronism with the motion of a piston, and the air-fuel mixture is introduced into the combustion chamber 34. The mixture is compressed, and is ignited by spark energy from an ignition plug 36. The combustion energy of the mixture is transformed into kinetic energy for moving the piston.

The ignited mixture is emitted as an exhaust gas from an exhaust valve (not shown) into the atmosphere through an exhaust pipe 76, a catalyst converter 82 and a muffler 86. The exhaust pipe 76 is provided with an exhaust gas recirculation pipe 78 (hereinbelow, abbreviated to "EGR pipe"), through which part of the exhaust gas is led to the intake manifold 26. That is, part of the exhaust gas is recirculated onto the suction side of the engine again. The quantity of recirculation is determined by the valve opening quantity of an exhaust gas recirculator 28. This valve opening quantity is controlled by an output EGR of the control circuit 10. Further, the valve position of the exhaust gas recirculator 28 is converted into an electric signal, which is applied to the control circuit 10 as a signal QE.

The exhaust pipe 76 is provided with a $\lambda$-sensor 80, which detects the mixing ratio of the mixture sucked into the combustion chamber 34. Concretely, an $O_2$-sensor (oxygen sensor) is usually used. It detects the concentration of oxygen in the exhaust gas, and generates a voltage $V\lambda$ corresponding to the oxygen concentration. The output $V\lambda$ of the $\lambda$-sensor 80 is applied to the control circuit 10. The catalyst converter 82 is provided with an exhaust temperature sensor 84, and an output TE corresponding to the exhaust temperature is applied to the control circuit 10.

The control circuit 10 is provided with a negative power supply terminal 88 and a positive power supply terminal 90. Further, a signal IGN which controls the sprak of the ignition plug 36 above described is applied from the control circuit 10 to the primary coil of an ignition coil 40, and a high voltage which is generated in the secondary coil of the ignition coil is applied to the ignition plug 36 through a distributor 38 so as to develop the spark for the combustion within the combustion chamber 34. More concretely, the ignition coil 40 is provided with a positive power supply terminal 92, and the control circuit 10 is provided with a power transistor for controlling the primary coil current of the ignition coil 40. A series circuit which consists of the primary coil of the ignition coil 40 and the power transistor is formed between the positive power supply terminal 92 of the ignition coil 40 and the negative power supply terminal 88 of the control circuit 10. When the power transistor is rendered conductive, electromagnetic energy is accumulated in the ignition coil 40. When the power transistor is rendered nonconductive, the electromagnetic energy is applied to the ignition plug 36 as energy having a high voltage.

The engine 30 is provided with a water temperature sensor 96, which detects the temperature of engine cooling water 94 and which feeds the control circuit 10 with a signal TW corresponding to this temperature. Further, the engine 30 is provided with an angle sensor 98 which detects the rotational position of the engine. Owing to this sensor 98, a reference signal PR is generated every e.g. 120 degrees in synchronism with the rotation of the engine, and an angle signal PC is generated each time the engine rotates a predetermined angle (e.g., 0.5 degree). These signals are applied to the control circuit 10.

In the system of FIG. 1, the air flow meter 14 may be replaced with a negative pressure sensor. A part 100 shown by dotted lines in the figure is the negative pressure sensor, which feeds the control circuit 10 with a voltage VD corresponding to the negative pressure of the intake manifold 26.

As the negative pressure sensor 100, a semiconductor negative pressure sensor is concretely considered. The boost pressure of the intake manifold is caused to act on one surface of a silicon chip, while the atmospheric pressure or a fixed pressure is caused to act on the other surface. In some cases, the other surface may well be held in a vacuum. With such a structure, the voltage VD corresponding to the manifold pressure is generated under the piezo-resistance effect or the like, and it is applied to the control circuit 10.

Figure 2:
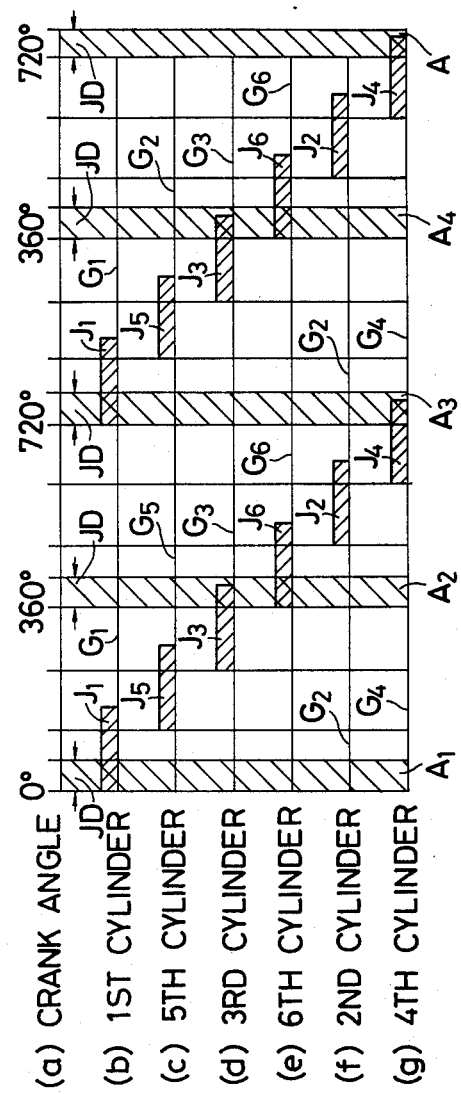
FIG. 2 is a diagram for explaining operations in FIG. 1.

FIG. 2 is an operation chart for explaining the ignition timings and fuel injection timings of a 6-cylinder engine versus the crank angle. (a) represents the crank angle. The reference signal PR is provided from the angle sensor 98 every crak angle of 120°. That is, the reference signals PR are applied to the control circuit 10 every crank angles of 0°, 120°, 240°, 360°, 480°, 600° and 720°.

In the figure, (b), (c), (d), (e), (f) and (g) represent the operations of the first cylinder, fifth cylinder, third cylinder, sixth cylinder, second cylinder and fourth cylinder, respectively. J1–J6 indicate the valve opening positions of the suction valves of the respective cylinders. As indicated in FIG. 2, the valve opening positions of the respective cylinders shift every 120° in terms of the crank angle. Although the valve opening positions and the valve opening widths are somewhat different depending upon engine structures concerned, they are substantially as illustrated in the figure.

In the figure, A1–A5 indicate the valve opening timings of the fuel injector 66, namely, the fuel injection timings. The time width JD of each of the injection timings A1–A5 indicates the valve opening time of the fuel injector 66. This time width JD can be considered as representing the fuel injection quantity of the fuel injector 66. The fuel injectors 66 are disposed in correspondence with the respective cylinders. These injectors are respectively connected in parallel with a driver circuit in the control circuit 10. In response to the signal INJ from the control circuit 10, accordingly, the fuel injectors corresponding to the respective cylinders open the valves and inject the fuel at the same time. The first cylinder illustrated at (b) in FIG. 2 will be referred to. In synchronism with a reference signal INTIS generated at the crank angle of 360°, the output signal INJ is applied from the control circuit 10 to the fuel injectors 66 which are disposed at the manifolds or suction ports of the respective cylinders. Thus, the fuel is injected as indicated at ·A2 for the period of time JD calculated by the control circuit 10. Since, however, the suction valve of the first cylinder is closed, the injected fuel is held in the vicinity of the suction port of the first cylinder and is not sucked into the cylinder. Subsequently, in response to a reference signal INTIS appearing at the crank angle of 720°, the signal is sent from the control circuit to the respective fuel injectors 66 again, and the fuel injection indicated at A3 is executed. The suction valve of the first cylinder is opened substantially simultaneously with this injection, and both the fuel injected at A2 and the fuel injected at A3 are drawn into the combustion chamber owing to the opening of the valve. The same applies to the other cylinders. That is, in the fifth cylinder illustrated at (c), fuels injected at A2 and A3 are drawn at the valve opening position J5 of the suction valve. In the third cylinder illustrated at (d), part of fuel injected at A2, fuel injected at A3 and part of fuel injected at A4 are drawn at the valve opening position J3 of the suction valve. The sum between the part of the fuel injected at A2 and the part of the fuel injected at A4 is equal to the quantity of one injection. Also in each suction stroke of the third cylinder, accordingly, the quantities of two injections are drawn in. Likewise, in the sixth, second and fourth cylinders respectively shown at (e), (f) and (g), fuel corresponding to two injections of the fuel injector is drawn in in one suction stroke. As understood from the above explanation, the quantity of fuel injection controlled by the fuel injection signal INJ from the control circuit 10 is half of the amount of fuel which needs to be drawn in, and the necessary fuel amount which corresponds to the air drawn in the combustion chamber 34 is obtained by the two injections of the fuel injector 66.

In FIG. 2, G1–G6 indicate ignition timings which correspond to the first cylinder–the sixth cylinder. By turning "off" the power transistor disposed in the control circuit 10, the primary coil current of the ignition coil 40 is cut off to generate the high voltage in the secondary coil. This high voltage is generated in the order of the ignition timings G1, G5, G3, G6, G2 and G4, and is distributed by the distributor 38 to the ignition plugs which are disposed in the respective cylinders. Thus, the respective ignition plugs spark in the order of the first cylinder, fifth cylinder, third cylinder, sixth cylinder, second cylinder and fourth cylinder, and the fuel-air mixture is ignited.

Figure 3:
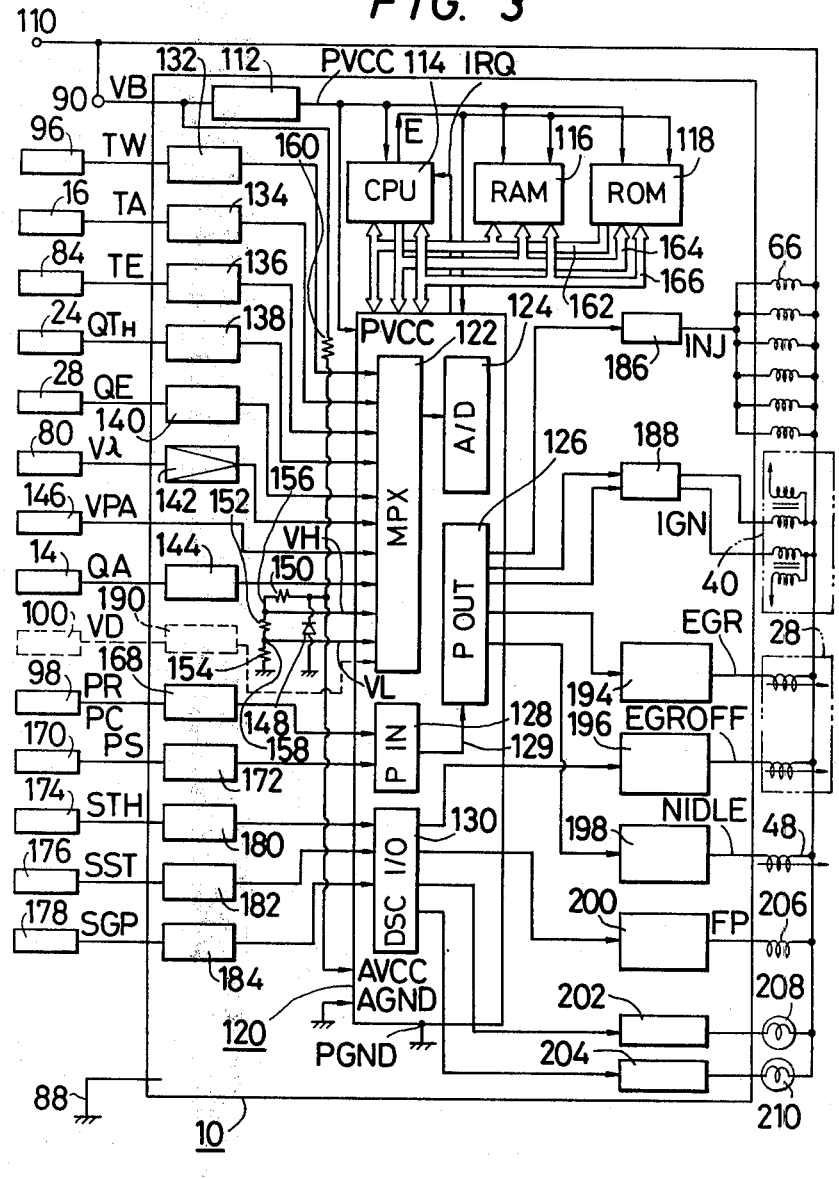
FIG. 3 is a detailed diagram of a control circuit in FIG. 1.

The detailed circuit arrangement of the control circuit 10 in FIG. 1 is shown in FIG. 3. The positive power supply terminal 90 of the control circuit 10 is connected to the plus terminal 110 of a battery, so that a voltage VB is supplied to the control circuit 10. The supply voltage VB is made a fixed voltage PVCC, for example, 5 [V] and held constant by means of a voltage regulator circuit 112. This fixed voltage PVCC is supplied to a central processor (hereinbelow, abbreviated "CPU"), a random access memory hereinbelow, abbreviated "RAM") and a read only memory (hereinbelow, abbreviated "ROM"). Further, the output PVCC of the voltage regulator circuit 112 is applied to an input/output circuit 120.

The input/output circuit 120 has a multiplexer 122, an analog-to-digital converter 124, a pulse output circuit 126, a pulse input circuit 128, a discrete input/output circuit 130, etc.

The multiplexer 122 receives analog signals, one of which is selected and applied to the analog-to-digital converter 124 on the basis of a compound from the CPU. As the analog input signals, the analog signal TW representative of the cooling water temperature of the engine, the analog signal TA representative of the suction temperature, the analog signal TE representative of the exhaust gas temperature, the analog signal QTH representative of the throttle opening, the analog signal QE representative of the valve opening state of the exhaust gas recirculator, the analog signal Vλ representative of the air excess ratio of the suction mixture, and the analog signal QA representative of the quantity of suction air are applied to the multiplexer 122 through filters 132–144 from the respective sensors shown in FIG. 1, i. e., the water temperature sensor 96, the suction temperature sensor 16, the exhaust temperature sensor 84, the throttle position detector 24, the exhaust gas recirculator 28, the λ-sensor 80, and the air flow meter QA. In the above analog signals, the output Vλ of the λ-sensor 80 is applied to the multiplexer through an amplifier 142 which has a filter circuit.

In addition, an analog signal VPA representative of the atmospheric pressure is applied from an atmospheric pressure sensor 146 to the multiplexer. The voltage VB is supplied from the positive power supply terminal 90 through a resistor 160 to a series circuit which consists of resistors 150, 152 and 154. Further, the terminal voltage of the series circuit composed of the resistors is suppressed to a fixed value by a Zener diode 148. The values of voltages VH and VL at respective junctures 156 and 158 between the resistors 150 and 152 and between the resistors 152 and 154 are applied to the multiplexer 122.

The aforecited CPU 114, and RAM 116, ROM 118 and input/output circuit 120 are respectively coupled by a data bus 162, an address bus 164 and a control bus 166. Further, a clock signal E is applied from the CPU to the RAM, the ROM and the input/output circuit 120. In synchronism with the clock signal E, data is transmitted through the data bus 162.

The multiplexer 122 of the input/output circuit 120 receives as its inputs the water temperature TW, the suction air temperature TA, the exhaust gas temperature TE, the throttle opening QTH, the exhaust recirculation quantity QE, the λ-sensor output Vλ, the atmospheric pressure VPA, the suction air quantity QA or the negative pressure VD to be substituted for the suction air quantity QA, and the reference voltages VH and VL. With respect to these inputs, the CPU 114 assigns an address through the address bus on the basis of an instruction program stored in the ROM 118, and the analog input of the assigned address is loaded. This analog input is sent from the multiplexer 122 to the analog-to-digital converter 124. The digital-converted value is held in a register corresponding to the particular input, and is loaded into the CPU 114 or RAM 116 on the basis of an instruction from the CPU 114 which is sent through the control bus 166 as may be needed.

The reference pulses PR and the angle signal PC are applied from the angle sensor 98 to the pulse input circuit 128 through a filter 168 in the form of a pulse train. Further, pulses PS at a frequency corresponding to a vehicular velocity are applied from a vehicular velocity sensor 170 to the pulse input circuit 128 through a filter 172 in the form of a pulse train.

A signal processed by the CPU 114 is held in the pulse output circuit 126. An output from the pulse output circuit 126 is applied to a power amplifier circuit 186, and the fuel injector is controlled on the basis of the amplified signal.

Numerals 188, 194 and 198 designate power amplifier circuits, which control the primary coil current of the ignition coil 40, the opening of the exhaust gas recirculator 28 and the opening of the air regulator 48 in response to output pulses from the pulse output circuit 126, respectively. The discrete input/output circuit 130 receives signals from a switch 174 for detecting that the throttle valve 20 is in the fully-closed state, a starter switch 176, and a gear switch 178 for indicating that the transmission gear is the top gear, through filters 180, 182, and 184 respectively, and it holds them therein. Further, it holds therein the processed signals from the central processor CPU 114. The signals with which the discrete input/output circuit 130 is concerned are signals each of which can have its content indicated by 1 (one) bit. On the basis of the signals from the central processor CPU 114, signals are fed from the discrete input/output circuit to power amplifier circuits 196, 200, 202 and 204. These signals function to shut the exhaust gas recirculator 28 and thus stop the recirculation of the exhaust gas, to control the fuel pump, to indicate the abnormal temperature of the catalyst and to indicate the overheating of the engine, respectively.

Figure 4:
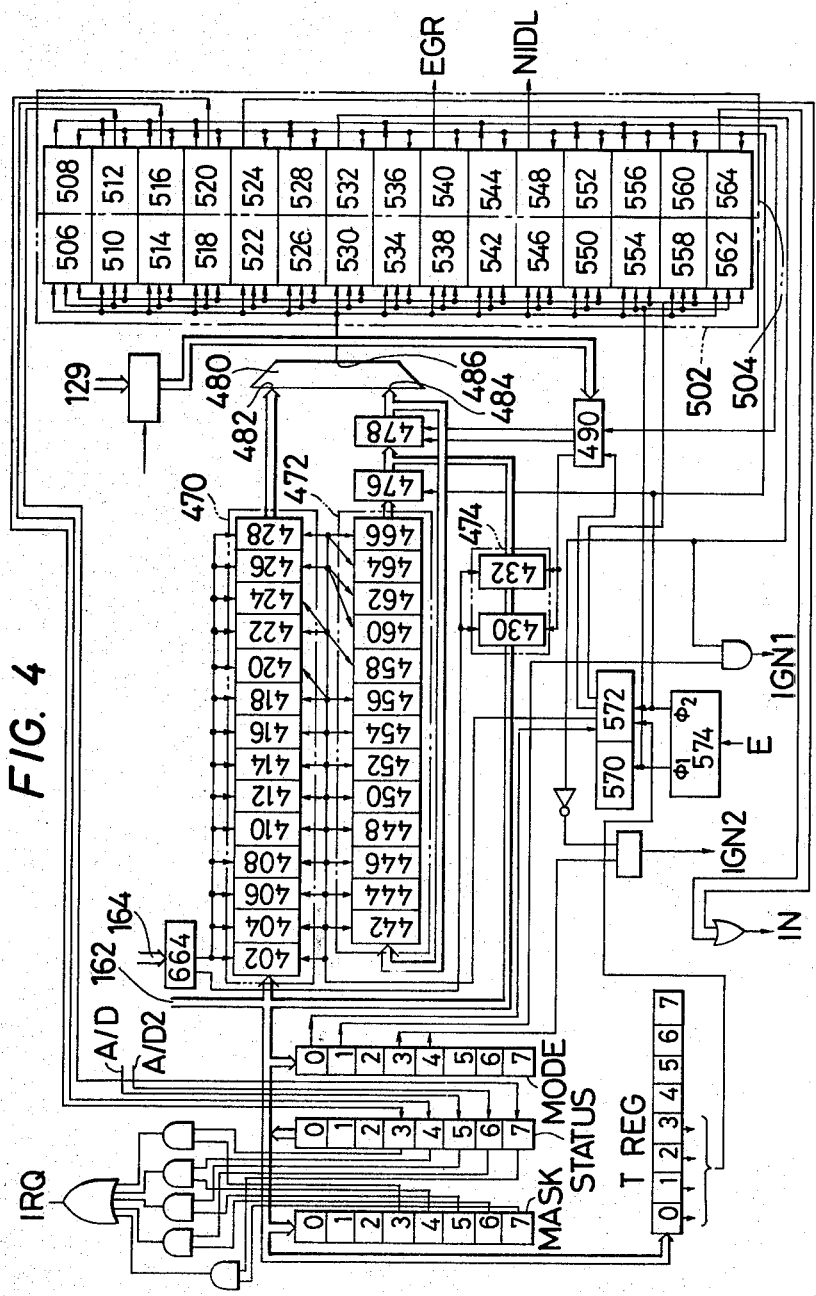
FIG. 4 is a partial detailed diagram of an input/output circuit in FIG. 3.

FIG. 4 shows a concrete circuit arrangement of the pulse output circuit 126. A group of registers 470 is a group of reference registers described above. They hold data processed by the CPU 114, or hold data indicative of predetermined constant values. The data is sent through the data bus 162 from the CPU 114. The designation of the register to hold the data is made through the address bus 164, and the data is applied to and held in the designated register.

A group of registers 472 is a group of "instantaneous" registers, which hold the instantaneous conditions of the engine, etc. The group of instantaneous registers 472, a latch circuit 476 and an incrementer 478 perform a counter function.

A group of output registers 474 has, for example, a register 430 which holds the revolution velocity of the engine, and a register 432 which holds the vehicular velocity. These values are obtained in such a way that, when certain conditions have been fulfilled, values in the instantaneous registers are loaded. With respect to data held in the group of output registers 474, the relevant register is selected by a signal sent through the address bus from the CPU, and the data is transmitted from this register to the CPU 114 through the data bus 162.

A comparator 480 receives the reference data from the selected one of the reference registers and the instantaneous data from the selected one of the instantaneous registers, at respective input terminals 482 and 484, and carries out a comparing operation. The result of comparison is provided from an output terminal 486. The output is set in a predetermined one of a first group of comparison output registers 502 which operate as comparison result holding circuits. Thereafter, it is set in a predetermined one of a second group of comparison output registers 504.

The reading and writing operations of the group of reference registers 470, the group of instantaneous registers 472 and the group of output registers 474, the operations of the incrementer 478 and the comparator 480, and the operations of setting the outputs into the first comparison output register 502 and the second comparison output register 504 are processed within a certain fixed time. The various processing operations are executed in a time division manner in accordance with the stage sequence of a stage counter 572. The predetermined registers among the group of reference registers 470, the group of instantaneous registers 472 and the first and second groups of comparison result registers 502 and 504, and if necessary, the predetermined register in the group of output registers 474 are selected at each stage. The incrementer 478 and the comparator 480 are used in common.

Figure 5:
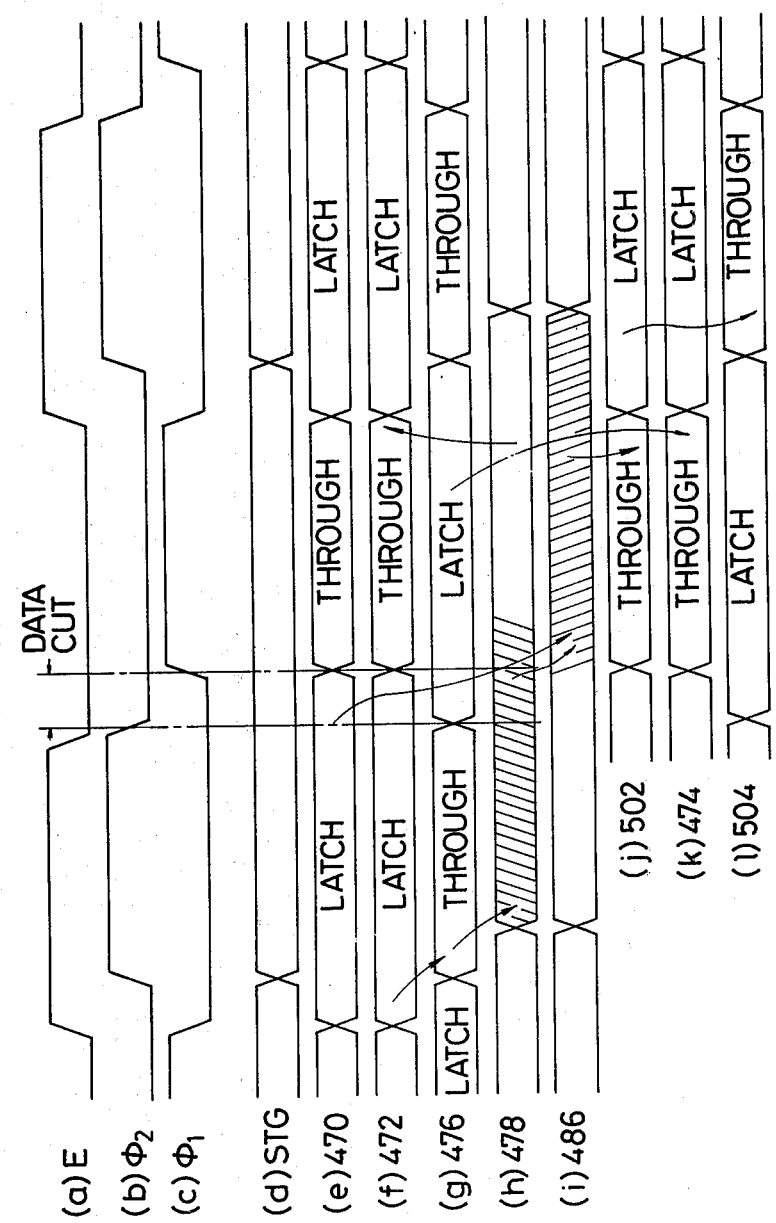
FIG. 5 is a diagram for explaining operations in FIG. 4.

FIG. 5 is a chart for explaining timings in FIG. 4. The clock signal E is supplied from the CPU 114 to the input/output circuit 120. This signal is illustrated at (a). Two clock signals $\phi 1$ and $\phi 2$ which do not overlap are prepared from the clock signal E by means of a circuit 574. These signals are illustrated at (b) and (c). The circuit shown in FIG. 4 is operated by the clock signals $\phi 1$ and $\phi 2$.

(d) in FIG. 5 illustrates a stage signal, which is switched by the rise of the clock signal $\phi 2$. The processing operations of the respective stages are executed in synchronism with the clock signal $\phi 2$. In FIG. 5, "THROUGH" indicates that a latch circuit or a register circuit is in the "enable" state and that the output of such a circuit depends upon the input thereof.

"LATCH" indicates that such a circuit holds certain data therein and that the output of the circuit does not depend upon the input thereof.

The stage signal shown at (d) serves as a readout signal for the reference register 470 or the instantaneous register 472, and reads out a content from a certain selected predetermined register. (e) and (f) illustrate the operations of the reference register 470 and the instantaneous register 472, respectively. These operations are effected in synchronism with the clock $\phi$.

The operation of the latch circuit 476 is illustrated at (g). This circuit has a THROUGH status when the clock $\phi 2$ is at a high level, and it writes data of a certain specific register among the group of instantaneous registers 472. It has a LATCH status when the clock $\phi 2$ has become a low level. In this way, the data of the predetermined register among the group of instantaneous registers as corresponds to the particular stage is held. The data held in the latch circuit 476 is corrected on the basis of external conditions by the incrementer 478 which is not synchronized with the clock signal.

Here, the incrementer 478 has functions to be stated below on the basis of signals from an increment controller 490. The first function is the increment function, according to which a value indicated by input data is increased by 1 (one). The second function is the non-increment function, according to which the input is passed through as it is without being increased. The third function is the reset function, according to which any input is converted into data indicative of the value 0 (zero).

The flow of data of the instantaneous register will now be explained. One register among the group of instantaneous registers 472 is selected by the stage counter 572, and the data held therein is applied to the comparator 480 through the latch circuit 476 as well as the incrementer 478. Further, a closed loop which extends from the output of the incrementer 478 back to the original selected register is formed. Accordingly, when the incrementer presents the function of adding one to the data, the closed loop functions as a counter. However, if in this closed loop there occurs a state in which while the data of the group of instantaneous registers is being provided as an output from the specific selected register, data is re-routed and is applied as an input, then a malfunction will take place. In order to cut off the data, therefore, the latch circuit 476 is employed. The latch circuit 476 has a THROUGH status in synchronism with the clock $\phi 2$. On the other hand, the THROUGH status in which an input is written into the instantaneous register is synchronous with the clock $\phi 1$. Accordingly, blocking of the data is effected between the clocks $\phi 2$ and $\phi 1$. That is, even when the value of the specified register among the group of registers 472 is altered, the output of the latch circuit 476 does not change.

Likewise to the incrementer 478, the comparator 480 operates without being synchronized with the clock signal. The input terminals of the comparator 480 receive the retained data of one reference register selected from among the group of reference registers 470 and the retained data of one register selected from among the group of instantaneous registers 472, the latter data being transmitted through the latch circuit and the incrementer. The comparison result of the data is set in the first group of comparison result registers 502 which fall into the THROUGH status in synchronism with the clock signal $\phi 1$. Further, this data is set in the second group of comparison result registers 504 which takes on the THROUGH status by the clock $\phi 2$. An output from the register 504 becomes a signal for controlling the functions of the incrementer, or a drive signal for the fuel injector, the ignition coil, the exhaust gas recirculator or the like.

On the basis of this signal, the measured result of the revolution speed of the engine or the vehicular speed is written from the group of instantaneous registers 472 into the group of output registers 474 at each stage. For example, in case of writing the engine revolution speed, a signal which represents that a fixed time has elapsed is retained in the second comparison result register RPMWBF 552, and the retained data of the instantaneous register 462 is applied to the register 430 in the group of output registers on the basis of the output of this register 552 at a stage RPM in Table 1 to be stated later. At this time, where the signal representative of the elapse of the fixed time is not retained in the second comparison result register RPMWBF 552, the operation of putting the retained data of the register 462 into the register 430 is not conducted even at the stage RPM.

On the other hand, on the basis of a signal retained in the second comparison result register VSPWBF 556, the data of the instantaneous register 468 is applied to the output register 432 at the timing of a stage VSP as data representative of the vehicular speed.

The writing of the data representative of the engine revolution speed RPM and the vehicular speed VSP into the group of output registers 474 is carried out as follows. In FIG. 5, the stage signal STG occurs at RPM or VSP. The data of the instantaneous register 462 or 468 is written when the latch circuit 476 has a THROUGH status at the high level of the clock $\phi 2$. The data is latched when the clock $\phi 2$ has a low level. On the basis of a signal from the register RPMWBF 552 or VSPWBF 556, the data thus retained is written when the group of output registers 474 has a THROUGH status in synchronism with the high level of the clock $\phi 1$ as illustrated at (k) in FIG. 5. It is latched at the low level of the clock $\phi 1$.

Where the CPU 114 reads the data held in the group of output registers 474, the register is designated through the address bus 164 from the CPU 114, and the data is loaded in synchronism with the clock signal E illustrated at (a) in FIG. 5.

Figure 6:
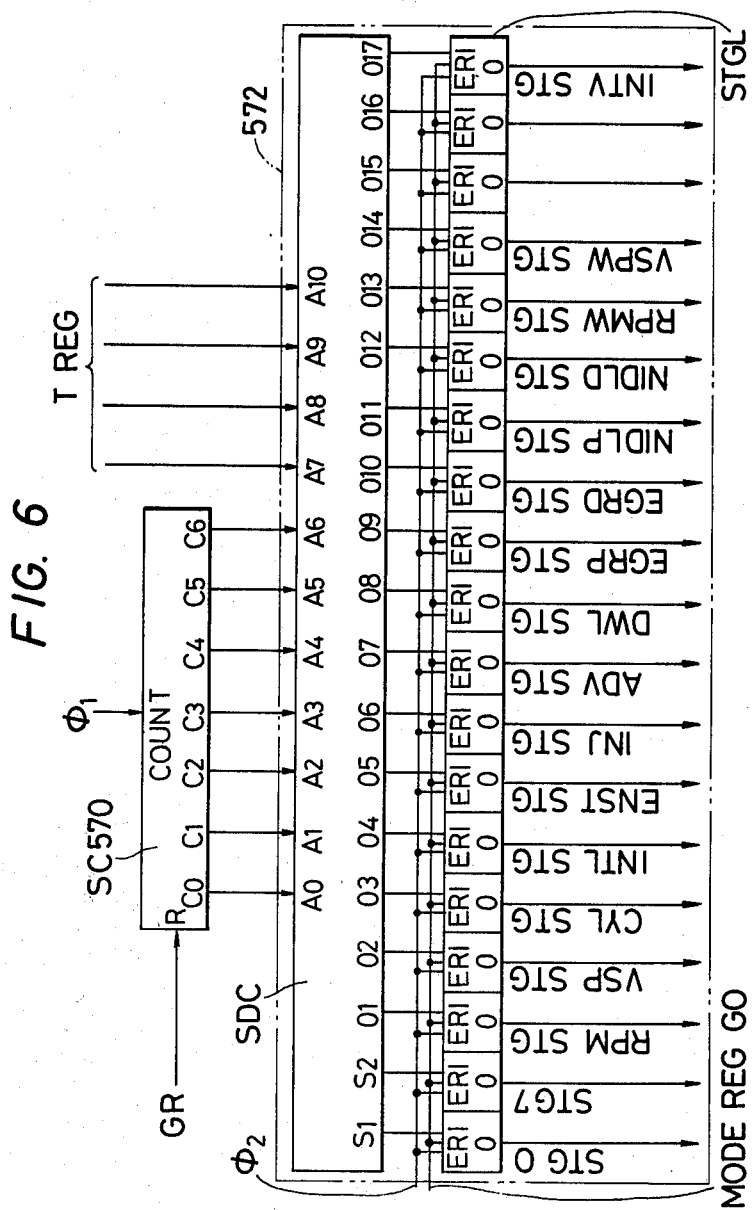
FIG. 6 is a detailed diagram of a stage counter in FIG. 4.

A circuit for generating the stage signal STG is shown in FIG. 6. A stage counter SC 570 is caused to be incremented by the signal $\phi 1$ from the circuit 574. Outputs C0–C6 of the stage counter SC 570 and outputs of a T register in FIG. 4 are applied to a stage decoder SDC as inputs. The stage decoder SDC writes signals 01–017 into a stage latch circuit STGL in synchronism with the clock $\phi 2$ as its outputs.

A reset input of the stage latch STGL receives a $2^0$-bit signal GO of a MODE register in FIG. 4. When the $2^0$-bit signal GO of the MODE register has a low level, all the outputs of the STGL become low, and all the processing operations are stopped. On the other hand, when the GO signal goes high, the stage signals STG are provided in a predetermined sequence again, and the processing operations are executed on the basis of them.

The stage decoder SDC can be readily realized by the use of a read only memory or the like. Detailed contents of 00–6F of the stage signals STG being the outputs of the stage latch STGL are indicated in Table 1.

TABLE 1

(Hexadecimal)

| $C_0$-$C_2$ \ $C_3$-$C_6$ | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | EGRP | NIDLP | — | RPMW | ENST | — | — | — | EGRD | NIDLD | — | VSPW | INTV | — | — | — |
| 1 | INTL | INTL | INTL | INTL | INTL | INTL | INTL | INTL | INTL | INTL | INTL | INTL | INTL | INTL | INTL | INTL |
| 2 | CYL | CYL | CYL | CYL | CYL | CYL | CYL | CYL | CYL | CYL | CYL | CYL | CYL | CYL | CYL | CYL |
| 3 | ADV | ADV | ADV | ADV | ADV | ADV | ADV | ADV | ADV | ADV | ADV | ADV | ADV | ADV | ADV | ADV |
| 4 | DWL | DWL | DWL | DWL | DWL | DWL | DWL | DWL | DWL | DWL | DWL | DWL | DWL | DWL | DWL | DWL |
| 5 | VSP | VSP | VSP | VSP | VSP | VSP | VSP | VSP | VSP | VSP | VSP | VSP | VSP | VSP | VSP | VSP |
| 6 | RPM | RPM | RPM | RPM | RPM | RPM | RPM | RPM | RPM | RPM | RPM | RPM | RPM | RPM | RPM | RPM |
| 7 | INJ | INJ | INJ | INJ | INJ | INJ | INJ | INJ | INJ | INJ | INJ | INJ | INJ | INJ | INJ | INJ |

First, a general reset signal GR is applied to a reset terminal of the stage counter SC 570 in FIG. 6. Thus, all the counter outputs C0–C6 become "0". The general reset signal is sent from the CPU when operation of this control circuit begins. When the clock signal $\phi 2$ is applied under this state, the stage signal STG at EGRP is provided at the rise of the clock signal $\phi 2$. A processing operation EGRP is executed on the basis of this stage signal. Subsequently, the stage counter SC 570 counts up by 1 (one) by the clock $\phi 1$. Further, the next stage signal STG at INTL is provided by the clock $\phi 2$. A processing operation INTL is executed on the basis of the stage signal INTL STG. A stage signal CYL STG is subsequently provided, and a processing operation CYL is executed. Thereafter, a stage signal ADV is provided, and a processing operation ADV is executed. When, in this manner, the stage counter SC 570 continues the count-up in synchronism with the clock signal $\phi 1$, the stage signals STG are provided in synchronism with the clock signal $\phi 2$, and the processing operations corresponding to these signals are executed.

When all the outputs C0–C6 of the stage counter SC 570 become "1", a stage signal INJ STG is provided and a processing operation INJ is executed. Then, all the processing operations in Table 1 are completed. Subsequently, all the outputs C0–C6 of the stage counter SC 570 are made "0" by the clock signal $\phi 1$, and the stage signal EGRP STG is provided by the clock signal $\phi 2$ to execute the processing operation STG. In this way, the processing operations of Table 1 are repeated.

The processing operations of the various stages indicated in Table 1 are listed in Table 2.

TABLE 2

| Stage Signal | Processing Operation |
|---|---|
| EGRP STG | In order to determine the period of a pulsed current for driving the EGR valve, it is determined if the time of data of the register 418 has elapsed. |
| INTL STG | In order to generate the reference signal INTLS, it is determined, if the engine crankshaft has been rotated by an angle of data of the register 406 from the reference signal PR of the angle sensor. |
| CYL STG | In order to form the signal CYL corresponding to one revolution of the crankshaft, it is determined if the reference signal INTLS of data of the register 404 has been generated. |
| ADV STG | In order to form the ignition timing signal, it is determined if the engine crankshaft has rotated by an angle of data of the register 414 from the reference signal. |
| DWL STG | In order to form a signal representative of the conduction initiating point of the primary current of the ignition coil, it is determined if the engine crankshaft has rotated by an angle of data of the register 416 from the reference signal immediately preceding. |
| VST STG | In order to measure the vehicular speed, a signal representative of the elapse of a fixed time (output of VSPWBF) is used. When the fixed time has elapsed, the measured value is retained in the output register. When it has not yet elapsed, the counting of the vehicular speed pulses is continued. |
| RPM STG | In order to measure the engine revolution speed, a signal representative of the elapse of a fixed time (output of RPMBF) is used. When the fixed time has elapsed, the measured value is retained in the output register. When it has not yet elapsed, the counting of the vehicular speed pulses is still continued. |
| INJ STG | In order to form the INJ signal representative of the valve opening time of the fuel injector, it is determined if the time of data of the register 412 has elapsed from the CYL signal. |
| NIDLP STG | In order to determine the period of a pulsed current for driving the air regulator, it is determined if the time of data of the register 422 has elapsed. |
| RPMW STG | In order to measure the engine revolution speed, it is determined if a fixed time for counting pulses synchronous with the engine crankshaft revolutions has elapsed. |
| ENST STG | In order to detect that the engine has stopped accidentally, the condition under which no signal has been received from the angle sensor for a fixed time is detected. |
| EGRD STG | It is determined if the pulse width of the EGR valve-driving pulse current has become a value based on data of the register 420. |
| NIDLD STG | It is determined if the pulse width of the air regulator-driving pulse current has become a value based on data of the register 424. |
| VSPW STG | In order to measure the vehicular speed, it is determined if a fixed time for counting pulses synchronous with the vehicular speed has elapsed. |
| INTV STG | It is determined if a time based on data of the register 408 has elapsed. |

Output signals STG0 and STG7 from the stage latch circuit STGL in FIG. 6 serve to synchronize inputs from the external sources and the clock signals within the input/output circuit 120. The output STG0 is provided when all the outputs C0–C2 of the stage counter SC 570 are "0", whereas the output STG7 is provided when all the outputs C0–C2 of the stage counter SC 570 are "1".

As the external signals, there are for example the reference signal PR and the angle signal PC which are generated in synchronism with the revolution of the engine crankshaft, and the vehicular speed pulse PS which is generated in synchronism with the revolution of a wheel. The pulse periods of these signals vary greatly, and the signals are not synchronous with the clock signals $\phi 1$ and $\phi 2$ as they are. It is accordingly impossible to determine whether the increments are to be made at the stage ADV STG, the stage VSP STG and the stage RPM STG in Table 1.

It therefore becomes necessary to synchronize the external pulse, for example, the pulse from the sensor and the stage of the input/output circuit. Moreover, in order to enhance the detection accuracy, the angle signal PC or the vehicular speed signal PS needs to have the rising edge and falling edge of its input pulse synchronized with the stage signal. With respect to the reference signal PR, the rising edge may be synchronized.

Figure 7:
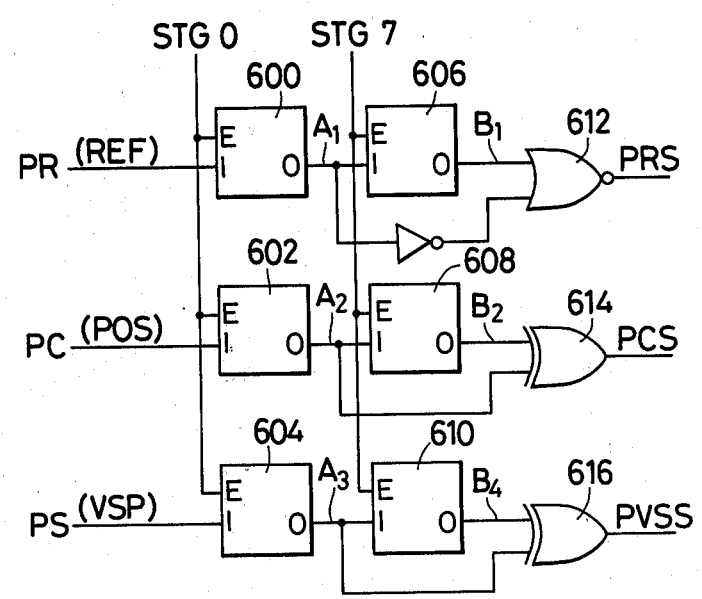
FIG. 7 is a detailed diagram of a synchronizing circuit.

A signal which establishes synchronism by the use of the outputs STG0 and STG7 of the stage latch circuit STGL in FIG. 6 is formed at the timing $\phi 2$. A circuit therefor is shown in FIG. 7. The operating timings of the circuit are illustrated in FIG. 8.

As the external input pulses such as sensor outputs, the reference pulse PR, the angle signal PC and the vehicular speed signal PS, for example, are respectively latched in latch circuits 600, 602 and 604 in FIG. 7 by the STG0 output indicated in FIG. 6.

Figure 8:
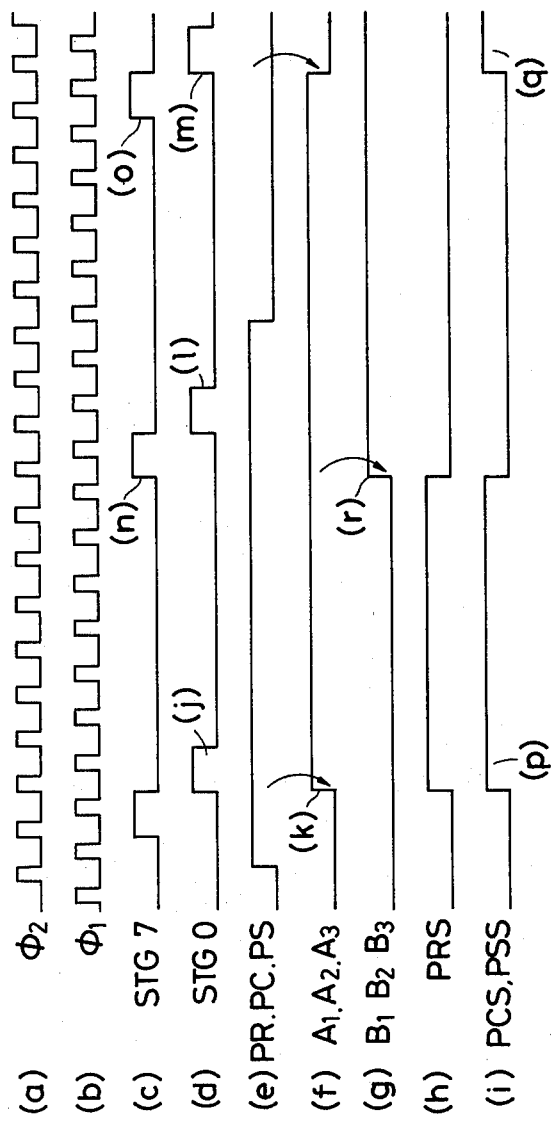
FIG. 8 is a diagram for explaining operations in FIG. 7.

In FIG. 8, (a) indicates the clock signal $\phi 2$, (b) indicates the clock signal $\phi 1$, and (c) and (d) indicate the stage signals STG7 and STG0 respectively. As explained with reference to FIG. 6, the stage signals are generated in synchronism with $\phi 2$. A signal illustrated at (e) is the output pulse from the angle sensor or the vehicular speed sensor, and is the reference pulse PR or the angle pulse PC or the vehicular speed pulse PS. The generation timing of the signal and the duty and period of the pulse are irregular, and the signal is applied independently of the stage signal.

Assuming now that signals are shown at (e) in FIG. 8 are applied to the latch circuits 600, 602 and 604, they are respectively latched by the stage signal STG0 (pulse (j) in the figure). Accordingly, points A1, A2 and A3 in FIG. 7 become high at a point of time (k) as indicated at (f) in FIG. 8. Since the input signals PR, PC and PS have a high level at the stage signal STG0 indicated at (l), the high level signals are respectively latched in the latch circuits 600, 602 and 604. However, the input signals PR, PC and PS are at a low level at the stage signal STG0 indicated at (m), so that the low level signals are latched. Accordingly, the outputs A1, A2 and A3 of the respective latch circuits 600, 602 and 604 become as shown at (f). Since latch circuits 606, 608 and 610 latch the respective outputs A1, A2 and A3 with (n) of the stage signal STG7, outputs B1, B2 and B3 rise from a point of time indicated at (o). The high level is also latched at (p) of the stage signal STG7, so that the high level is continued. Accordingly, the output signals B1, B2 and B3 of the respective latch circuits 606, 608 and 610 become as illustrated at (g).

A NOR circuit 612 receives the signal B1 and the signal A1 which is fed through an inverter, and a synchronized reference signal PRS is generated as illustrated at (h). The synchronized reference signal PRS follows the rise of the reference signal PR, and has a pulse width from the stage signal STG0 to the stage signal STG7.

Exclusive OR circuits 614 and 616 receive the signals A2 and B2 and the signals A3 and B3, respectively. A signal (q) illustrated at (i) is generated at the rising edge of the signal PC or PV, while a signal (r) is generated at the falling edge of the signal PC or PV. The duty of the signal (q) or (r) is equal to the duty of the signal shown at (h), and is determined by the stage signals STG0 and STG7.

In the above explanation, it has been assumed that the signals PR, PC and PS are applied with equal duties at the same time. In actuality, however, these signals are not simultaneously applied, and their duties are different. Further, even when the same signal itself is concerned, the period and the duty differ each time.

However, the signals are made into pulses of the fixed width by the synchronizing circuit in FIG. 7. This pulse width is determined by the time difference between the stage signals STG0 and STG7. Accordingly, the pulse width can be adjusted and altered by changing the stage signals to be applied to the latch circuits 600, 602 and 604 and the latch circuits 606, 608 and 610.

The pulse width is determined in relation to the timings of the stages in Table 1. As indicated in Table 1, the INTL stage is allotted in a status (1, 0) of the stage counter (C0-C2, C3-C6) and further (1, 1), (1, 2), (1, 3) ... every eighth stage.

Since each stage is set at 1 microsecond, the INTL stage is allotted every 8 microseconds. At the INTL stage, it is necessary to control the incrementer by detecting the angle signal PC. Therefore, when the output PC of the angle sensor 98 is applied to the synchronizer circuit shown in FIG. 7, the synchronizer circuit forms a synchronized pulse which always falls within the INTL stage, and the incrementer controller is controlled at the INTL stage on the basis of the synchronized pulse PCS.

The synchronized angle signal PCS is also detected at the stages *I* >V and RPM. The stages ADV and RPM are respectively allotted each time the values of C3-C6 count up by 1 (one) in the statuses in which the stage counter bits C0-C2 are "3" and "6". The allotted stages are repeated in cycles of 8 microseconds.

The signal STG0 in FIG. 7 is provided when the values of the bits C0-C2 of the stage counter are "0", while the signal STG7 is provided when the bits C0-C2 have a value of "7". These outputs are prepared irrespective of the bits C3-C6. As seen from FIG. 8, accordingly, the pulse width of the synchronized angle signal PCS is defined by the time that the stage counter outputs C0-C2 have values from "0" to "6". This pulse is detected at the stages INTL, ADV and RPM so as to control the incrementer controller.

The CYL stage at which the sychronized reference PRS is detected likewise to the above is allotted whenever the stage counter outtputs C0-C2 have the value of "2". When the reference pulse PR is received from the angle sensor 98 as an input, the synchronized reference PRS must be provided simultaneously with this input whenever the stage counter outputs C0-C2 are "2". The circuit of FIG. 7 fulfills this requirement satisfactorily because it provides the pulse width between the signals STG0 and STG7.

The VSP stage for detecting the wheel speed is allotted whenever the value of the stage counter outputs C0-C2 is "5". Accordingly, the synchronized PSS signal may be provided when the value of C0-C2 is "5". The circuit of FIG. 7 fulfills this value because the outputs C0-C2 provide the values of from "0" to "6". In the circuit of FIG. 7, it is also provided that a signal STG4, which occurs whenever the value of C0-C2 is "4", is generated and used instead of the signal STG0 and that a signal STG6 which occurs whenever the value of C0-C2 is "6" is used instead of the signal STG7. In this case, in the event that the signal PS has been received, the synchronized signal PSS is provided whenever the value of the outputs C0-C2 of the stage counter is "4" or "6".

Now the cycle of the stages will be explained. There are formed 128 types of stage signals in which the values of the stage counter outputs C0-C6 in Table 1 are from "0" to "127". When all these signals have been generated, a major cycle is completed, and a new major cycle begins again. The major cycle is composed of sixteen minor cycles, and the minor cycle is composed of eight types of stage signals. The minor cycles correspond to the values "0" to "7" of the stage counter outputs C0-C2, respectively. The minor cycle is completed in 8 microseconds.

In order to reliably synchronize the pulse output PR, PC or PS from the sensor and to reliably generate the synchronized pulse PRS, PCS or PSS, the output from the sensor must have a pulse width which is not smaller than the minor cycle. Regarding, for example, the angle pulse PC, the duty becomes narrower as the revolution speed of the engine is higher. By way of example, it becomes about 9 microseconds at 9,000 revolutions/min. Accordingly, in order to permit the angle pulse to be synchronized satisfactorily at 9,000 revolutions/minute, it is necessary to make the minor cycle shorter than the revolution speed. In the present embodiment, the minor cycle is 8 microseconds.

Figure 9:
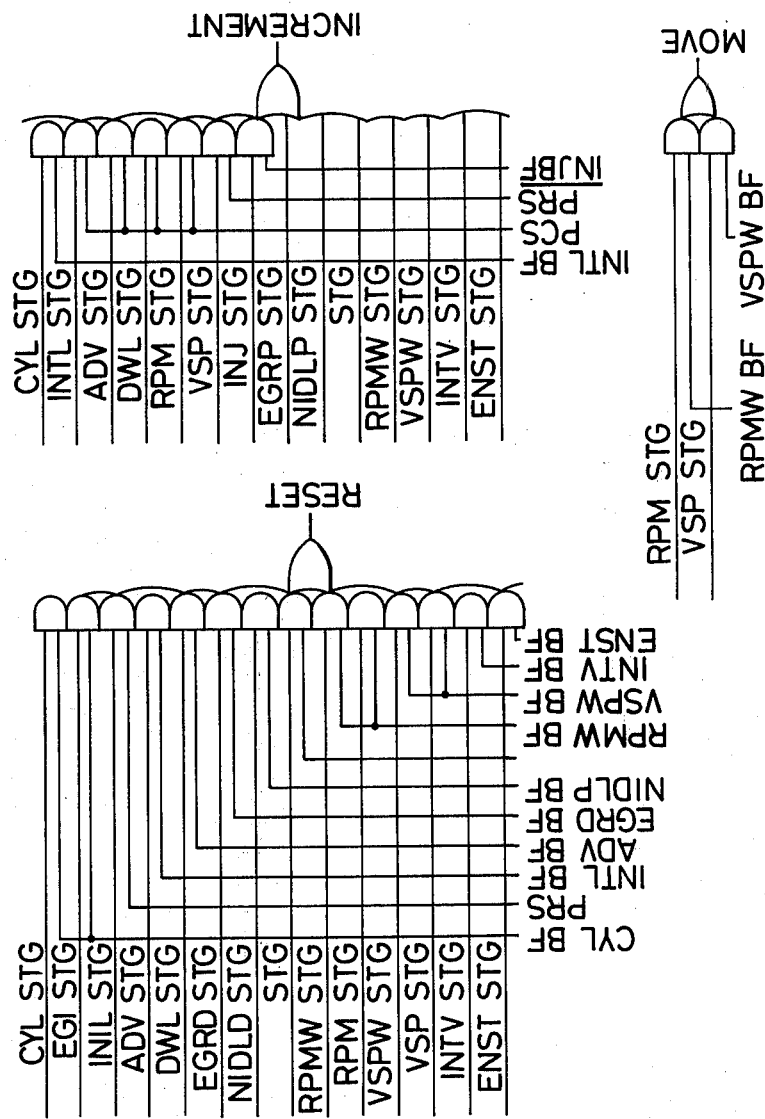
FIG. 9 is a detailed diagram of an incrementer controller.

Now, the operation of the incrementer 478 shown in FIG. 4 will be described. A detailed circuit of the incrementer 478 is shown in FIG. 9. As stated above, the incrementer has the three functions. The first function is the function of increasing input data by the value of "1", the second function is the function of resetting input data, and the third function is the function of delivering input data without any change. The increment function is executed by a signal ICNT, and the reset function by a signal IRST. When the ICNT signal is at a high level, the increment function is effected, and when it is at a low level, the non-increment function is effected. When the IRST signal is at a high level, the reset function is effected. The IRST signal has priority over the ICNT signal.

Using the stage signals which the various processings command, conditions may be selected. The conditions are the synchronized external inputs and the outputs of the second group of comparison result registers 504. Conditions for transmitting data to and writing them into the output registers 474 are similar to the conditions of the incrementer.

Each of the reference register 470, the instantaneous register 472, the latch circuit 476, the incrementer 478, the comparator 480 and the output register 474 set forth above is constructed of a circuit equal to or less than 10 bits.

Figure 10:
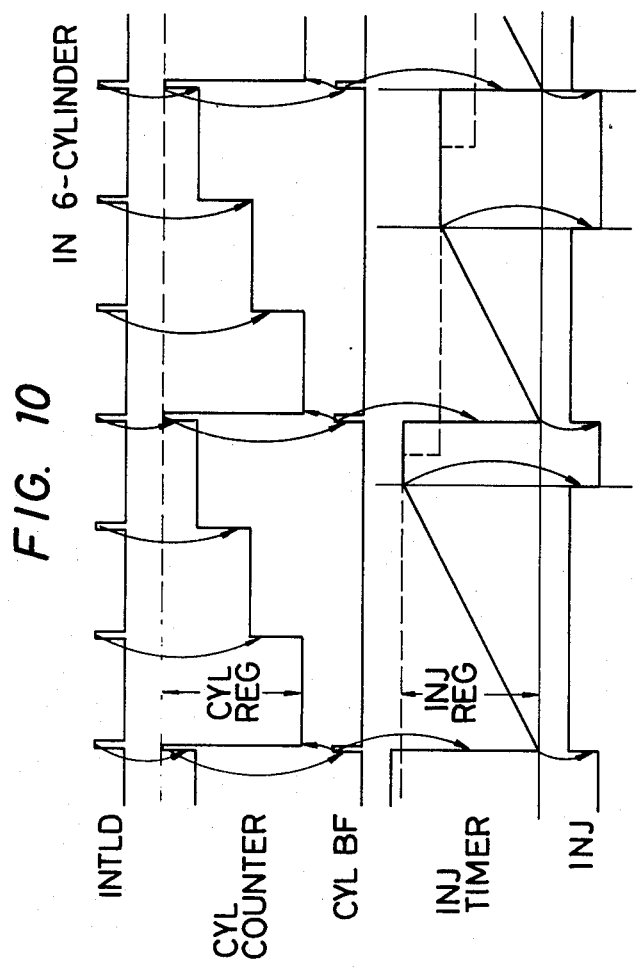
FIG. 10 is a diagram for explaining the operation of a fuel injection signal processing operation.

FIG. 10 is a diagram for explaining the processing operation of a fuel injection signal INJ. Since the initiation of injection differs in dependence on the number of cylinders, initial angle pulses INTLD prepared from the reference signal PRS are counted by a register 442 which operates as a CYL COUNTER, and the result is compared with the content of a CYL register 404 which holds therein a value associated with the number of cylinders. When the former has become greater than or equal to the latter, "1" is set in a CYL FF 506 of the first group of registers 502, and further, "1" is set in a CYL BF 508 of the second group of registers 504. By this CYL BF=1, the CYL COUNTEr 442 is reset. Also, when CYL BF=1, an INJ TIMER 450 which measures the injection time is reset. The content of the INJ TIMER is unconditionally incremented with the elapse of time, and is compared with the content of an INJD register 412 in which the injection time is set. When the former has become greater than or equal to the latter, "1" is set in an INJ FF 522 of the first group of registers. Also, "1" is set in an INJ BF 524 of the second group of registers. When INJ BF=1, further incrementing with the elapse of time is inhibited. The inverted output of this INJ BF becomes the duration of injection of fuel, and the valve opening time of the fuel injector.

The fuel injection time Ti greatly varies between the time of starting the engine and after the engine is warmed up. At starting, Ti=100 ms, and after the engine is warmed-up, Ti≈8 ms. The fuel injection time Ti is given by:

$$Ti = (\text{content of INJD REG 412}) \times (\text{period of INJ STG}).$$

Therefore, where the period of INJ STG is 8 μs (where the period of the clock $\phi_1$ is 1 μs, refer to Table 1), the number of bits of the registers associated with the processing INJ needs to be 14 bits in consideration of the injection time at starting.

As stated above, the registers in FIG. 4 are registers equal to or less than 10 bits. With this fact taken into account, it is not advisable from the standpoint of circuit arrangement that the capacity of the registers in FIG. 4 be 14 bits for the processing operation INJ. For example, an increase in the number of bits of registers among the group of reference registers 470 and the group of instantaneous registers 472 leads to an increase in the number of bits of the latch circuit 476, the incrementer 478 and the comparator 480. In total, (4 bits)×(5 circuits)=a 20 bit increase.

Figure 14:
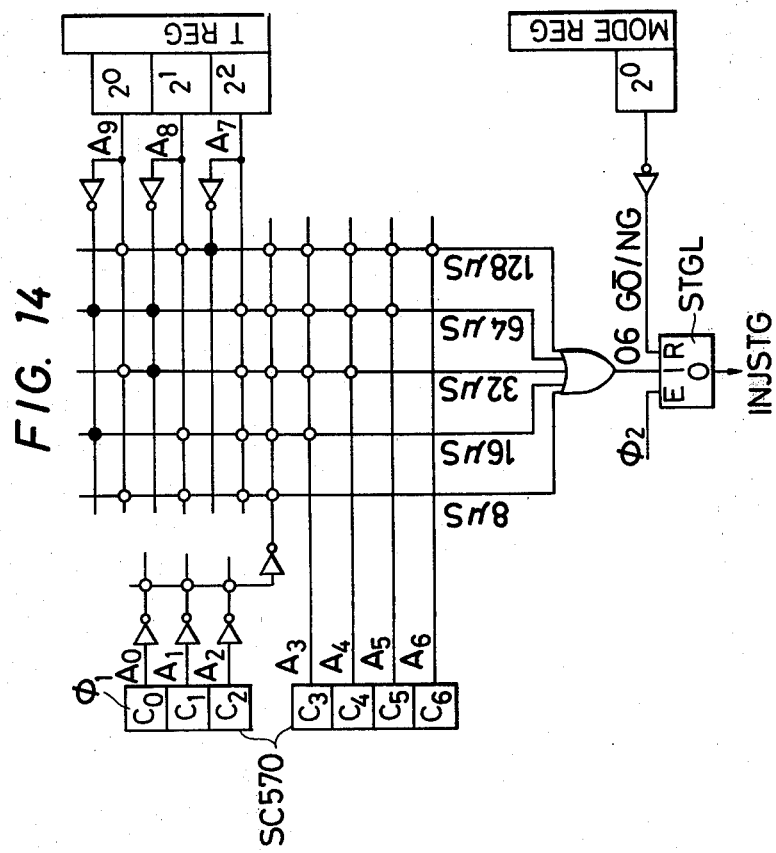
FIG. 14 is a diagram of an INJ stage signal generator circuit.

Therefore, in order to realize a fuel injection time Ti≈100 ms at starting, the values of the bits $2^0-2^2$ of the T REG are added to the bit capacity of the stage counter 570 as a condition for generting the signal INJ STG as illustrated in FIG. 6, and the period of the signal INJ STG is varied in five stages in dependence on the fuel injection time. That is, only the three lower bits of the T REG may be added to the circuit of FIG. 4. The portion of a circuit for generating INJ STG in FIG. 6 is shown in FIG. 14. In this figure, the stage decoder SDC is constructed of a ROM, and its output signal 06 becomes the signal INJ STG through the stage latch STGL. The respective stages $C_0-C_6$ of stage counter 570 are logically combined through the logic matrix shown with the outputs of the T register, specifically the $2^0-2^2$ bits designated by lines $A_9-A_7$. In other words, there are ten bit lines $A_0-A_9$ from which respective timing interval signals 8μs–128μs are produced. Five lines corresponding to the time intervals 8μs, 16μs, 32μs, 64μs and 128μs are coupled through an OR gate to stage latch STGL. The $2^0$ bit of the mode register is also coupled to the reset input of the latch while the clock input is derived from the clock signal $\phi_2$. The period of the signal INJ STG varies in such a manner that it is 8 μs when the content of the T REG is "0", that it is 16 μs when the content is "1", that it is 32 μs when the content is "2", that it is 64 μs when the content is "3", and that it is 128 μs when the content is "4". The maximum timee of the fuel injection time Ti is 131 ms (1023×128 μs). The T REG is adjusted according to the quantity of fuel injection.

Figure 11:
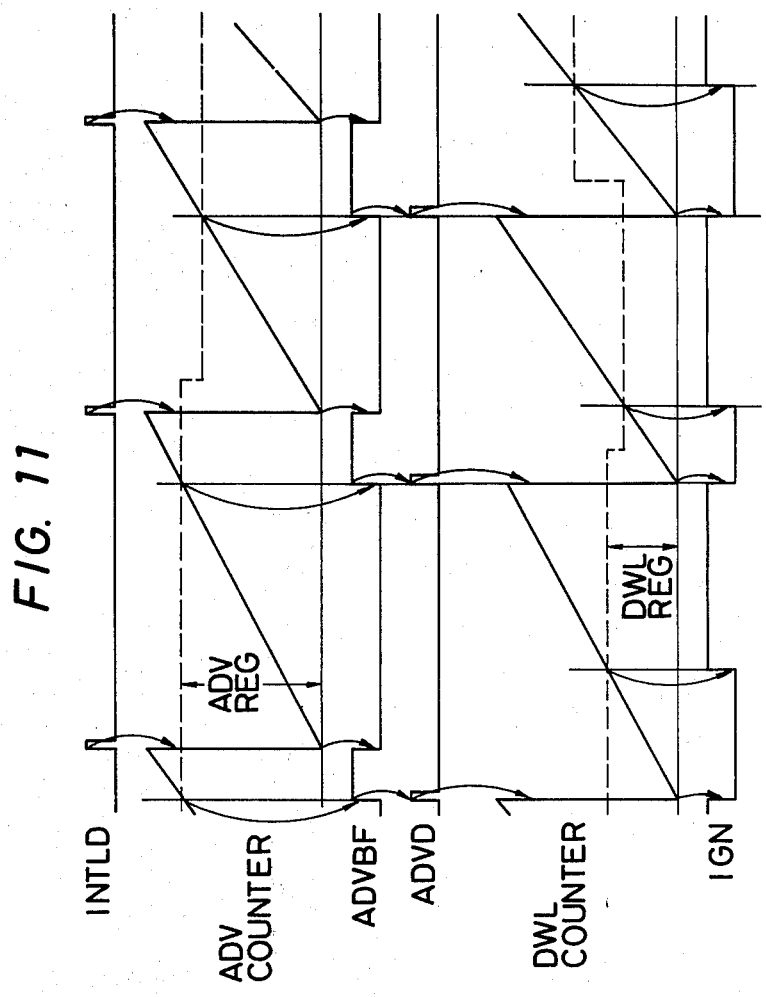
FIG. 11 is a diagram for explaining the operation of ignition timing control.

FIG. 11 is a diagram for explaining the processing operation of a signal which controls the ignition. A register 452 which operates as an ADV COUNTER is reset by the initial angle pulse INTLD, and it is incremented under the condition that the synchronized angle pulse PC is at the high level. On the basis of the pulse INTLD, the content of the register 452 is compared with that of an ADV register 414 which retains therein an ignition angle. When the former has become greater than or equal to the latter, "1" is set in an ADV FF 526 of the first group of registers 502, and "1" is set in an ADV BF 528 of the second group of registers 504. A DWL COUNTER 452 for initiating current conduction is reset by a signal ADVD indicative of the rise of this ADV BF, and it is incremented under the condition that the synchronized angle pulse PC is at the high level. The content of the counter 452 is compared with that of a DWL register 416 which retains therein an angle of initiating current conduction from the preceding ignition position. When the former has become greater than or equal to the latter, "1" is set in a DWL FF 530 of the first group of registers 502, and "1" is set in a DWL BF 532 of the second group of registers 504. The output of this DWL BF 532 becomes an ignition control signal ING1.

Figure 12:
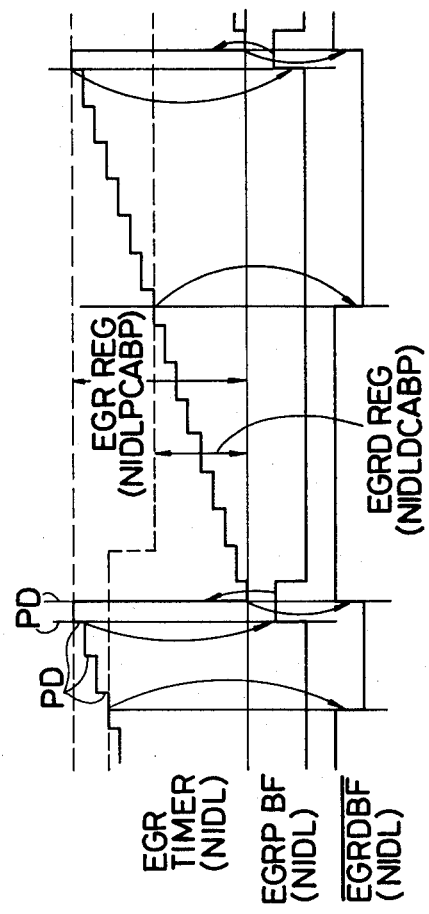
FIG. 12 is a diagram for explaining the operation of processing operations EGR or NIDL.

FIG. 12 is a diagram for explaining the processing of EGR (NIDL). Since both these devices are proportional solenoids, the duty control is carried out. There are two registers; an EGRP register 418 which holds the period therein, and an EGRD register 420 which holds the "on" time therein. As a timer, an EGR TIMER 456 is used. In case of the processing operation EGRP STG, the unconditional increment is effected. In addition, the data held in the EGRP register 418 and the EGR TIMER 456 are compared. When the result has become greater than or equal to zero, "1" is set in an EGRP FF 537 of the first group of registers 502. Further, an EGRP BF 536 of the second group of registers 504 is set at "1".

In case of the processing operation EGRD STG, the unconditional increment is effected, and the EGR TIMER 456 is reset when EGRP BF=1. When, upon comparing the contents of the EGRD register 420 and the EGR TIMER 456, the result has become greater than or equal to zero, an EGRD FF 538 is set at "1", and an EGRD BF 540 is set at "1". The inverted output of the EGRD BF 540 is a control signal for the EGR. The operation is similar to the processing operation NIDL.

Figure 13:
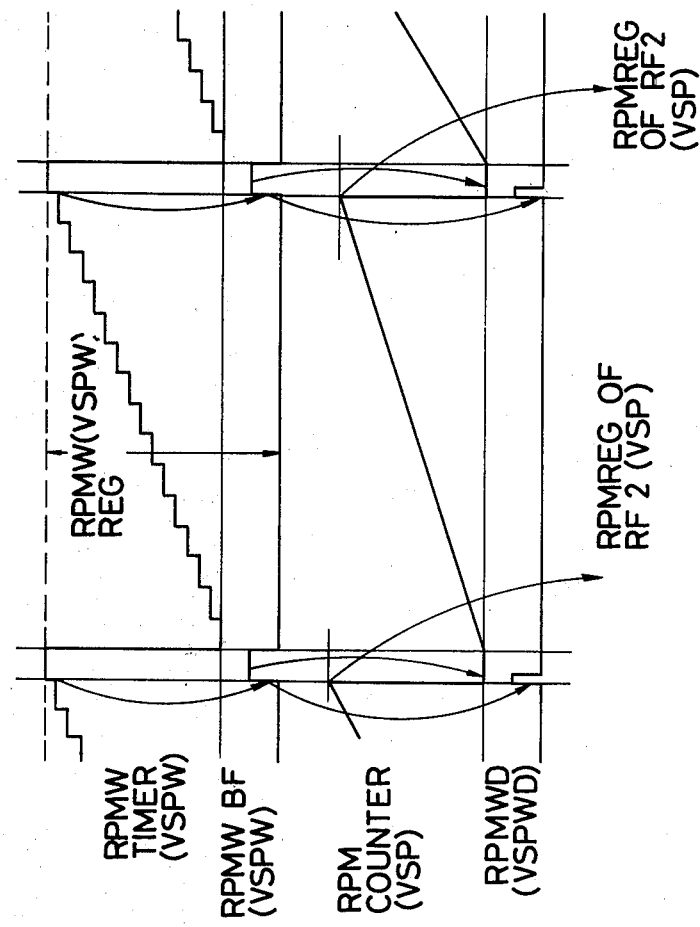
FIG. 13 is a diagram for explaining the operation of detecting the engine speed RPM or vehicular speed VSP.

FIG. 13 is a diagram for explaining the measuring method and processing of the engine revolution speed RPM (for vehicular speed VSP).

The measurement method is such that a certain measurement time width is determined by an RPMW TIMER 460 and that the synchronized angle pulses PC lying within the time width are counted.

The RPMW TIMER 460 which measures the time width is unconditionally incremented, and it is reset when the RPMW BF 552=1. "1" is set in an RPMW FF 550 when, upon comparing the contents of an RPMW register 426 holding a time width therein and the RPMW TIMER 460, the result has become greater than or equal to zero.

In response to a signal RPMWD indicative of the rise of the RPMW BF 552, the content of the RPM COUNTER 462 having counted the pulses PC is transmitted to the RPM register 430 of the output registers 474 and is written therein. When the RPMW BF 552=1, the RPM COUNTER 462 is reset.

The processing operation VSP STG is the same as RPM.

The functions of the various registers are listed in Table 3.

TABLE 3

| Register No. | Function of Register |
| --- | --- |
| 402 (ZERO . REG) | This holds a digital value corresponding to the value of zero, and transmits data representative of the zero value to the comparator by request. |
| 404 (CYL . REG) | This holds data CYL representative of a number determined by the number of cylinders. This data CYL is used for making, e.g., a signal which corresponds to one revolution of crank angle. |
| 406 (INTL . REG) | This holds data INTL representative of the sensor position and the crank angle for use in generating a reference signal INTLS. With this data INTL, the reference signal PR from the sensor 98 is shifted to a position of a pre-determined crank angle. |
| 408 (INTV . REG) | This holds data INTV representative of a time to be measured as a timer. When the data INTL is set, there is established, for example, a status in which an interrupt signal can be delivered after an elapse of this time. |
| 410 (ENST . REG) | This holds data ENST representative of the longest time to be used for detecting the status in which the engine has stopped accidentally. |
| 412 (INJD . REG) | This holds data INJD representative of the valve opening time of the fuel injection valve. |
| 414 (ADV . REG) | This holds data ADV representative of a crank angle from a reference signal to the primary current cutoff angle of the ignition coil. |
| 416 (DWL . REG) | This holds data DWL representative of a crank angle for putting the primary coil current of the ignition coil into the cutoff state from the reference signal immediately preceding until the initiation of the conduction of the primary coil current. |
| 418 (EGRP . REG) | This holds data EGRP representative of the pulse period of a pulsed current signal EGR for controlling the valve opening proportion of the EGR valve. |
| 420 (EGRD . REG) | This holds data EGRD representative of the pulse width of the pulsed current signal EGR for controlling the valve opening proportion of the EGR valve. |
| 422 (NIDL . REG) | This holds data NIDLP representative of the period of a signal NIDL of a pulsed current for controlling an air regulator which is disposed in order to control the quantity of airflow bypassing the throttle chamber. |
| 424 (NIDLD . REG) | This holds data NIDLD representative of the pulse width of the pulsed current signal NIDL. |
| 426 (RPMW . REG) | This holds data RPMW representative of a fixed time to be used for detecting the engine revolution speed. |
| 428 (VSPW . REG) | This holds data VSPW representative of a fixed time to be used for detecting the vehicular speed. |
| 442 (CYLC . REG) | This holds an instantaneous number representative of the number to which reference signal pulses have developed. |
| 444 (INTLC . REG) | This holds the number to which crank angle pulses have developed after the reference pulse from the angle sensor 98. |
| 446 (INTVT . REG) | This holds the instantaneous value of a value which increases each time a certain period of time, for example, 1024 microseconds lapse when data has been set in the INTV register 408. |
| 448 (ENSTT . REG) | This holds the instantaneous value of a value which increases each time a certain period of time, for example, 1024 microseconds elapses after the reference pulse from the angle sensor 98 has been received. The content of this register 448 is returned to zero when the next reference pulse is received. |
| 450 (INJT . REG) | This holds the instantaneous value of a value which increases a fixed time after the provision of a CYL signal, for example, a fixed time selected from among 8 microseconds, 16 microseconds, 32 microseconds, 64 microseconds, 128 microseconds and 256 microseconds. The selection of the fixed time is executed on the basis of the T register. |
| 452 (ADVC . REG) | This holds the instantaneous value of a value which increases each time the signal PC representative of a fixed crank angle, for example, 0.5 degree is provided from the angle sensor 98 after the reference signal INTLS has been delivered. |
| 454 (DWLC . REG) | This holds the instantaneous value of a value which increases each time the crank angle signal PC is provided from the angle sensor after the reference signal INTLS immediately preceding has been delivered. |
| 456 (EGRT . REG) | This holds the instantaneous value of a value which increases a fixed time, for example, 256 microseconds after the signal EGRP has been delivered. |
| 458 (NIDLT . REG) | This holds the instantaneous value of a value which increases each time a fixed period of time, for example, 256 microseconds elapses after the signal NIDLP has been delivered. |
| 460 (RPMWT . REG) | This holds an instantaneous value which increases a fixed time after the output pulse of the second comparison result holding register 552 has been provided. |
| 462 (RPMC . REG) | This holds an instantaneous value which increases each time the angle signal PC representative of a fixed crank angle is provided |

TABLE 3-continued

| Register No. | Function of Register |
|---|---|
| | from the angle sensor 98 after the output pulse of the second comparison result holding register 552 has been generated. |
| 430 (RPM . REG) | In this register, the data of the register 462 is set by the output signal of the second comparison result holding register and is held. This data is put onto a data bus by address and control commands from the CPU 114. |
| 464 (VSPSWT . REG) | This holds an instantaneous value which increases a fixed time after the output pulse of the second comparison result holding register 556 has been provided. |
| 468 (VSPC . REG) | This holds instantaneous value which increases each time a pulse corresponding to the revolution speed of a wheel is generated after the output pulse of the second comparison result holding register 556 has been provided. |
| 432 (VSP . REG) | In this register, the data of the register 468 is set by the output signal of the second comparison result holding register 556 and is held. This data is put onto the data bus by address and control commands from the CPU 114. |
| 506 (CYLFF) | "1" is set under condition of (data of the register 404) $\leq$ (data of the register 442). |
| 508 (CYLBE) | The signal of the register 506 is set at the timing of a clock $\phi 2$. |
| 510 (INTLFF) | "1" is set under condition of (data of the register 406) $\leq$ (data of the register 444). |
| 512 (INTLBF) | The signal of the register 510 is set under condition of the clock $\phi 2$. |
| 514 (INTVFF) | "1" is set under condition of (data of the register 408) $\leq$ (data of the register 446) |
| 516 (INTVBF) | The signal of the register 514 is set under condition of the clock $\phi 2$. |
| 518 (FNSTFF) | "1" is set under condition of (data of the register 410) $\leq$ (data of the register 448). |
| 520 (ENSTBF) | The signal of the register 518 is set under condition of the clock $\phi 2$. |
| 522 (INJFF) | "1" is set under condition of (data of the register 412) $\leq$ (data of the register 450). |
| 524 | The signal of the register 522 is set under condition of the clock $\phi 2$. |
| 526 (ADVFF) | "1" is set under condition of (data of the register 414) $\leq$ (data of the register 452). |
| 528 (ADVBF) | The signal of the register 526 is set under condition of the clock $\phi 2$. |
| 530 (DWLFF) | "1" is set under condition of (data of the register 416) $\leq$ (data of the register 454). |
| 532 (DWLBF) | The signal of the register 530 is set at the timing of the clock $\phi 2$. |
| 534 (EGRPFF) | "1" is set under condition of (data of the register 418) $\leq$ (data of the register 456). |
| 536 (EGRPBF) | The signal of the register 534 is set at the timing of the clock $\phi 2$. |
| 538 (EGRDFF) | "1" is set under condition of (data of the register 420) $\leq$ (data of the register 456). |
| 540 (EGRDBF) | The signal of the register 538 is set at the timing of the clock $\phi 2$. |
| 542 (NIDLPFF) | "1" is set under condition of (data of the register 422) $\leq$ (data of the register 458). |
| 544 (NIDLPBF) | The signal of the register 542 is set at the timing of the clock $\phi 2$. |
| 546 (NIDLDFF) | "1" is set under condition of (data of the register 424) $\leq$ (data of the register 458). |
| 548 (NIDLDBF) | The signal of the register 546 is set at the timing of the clock $\phi 2$. |
| 550 (RPMWFF) | "1" is set under condition of (data of the register 426) $\leq$ (data of the register 460). |
| 552 (RPMWBF) | The signal of the register 550 is set at the timing of the clock $\phi 2$. |
| 554 (VSPWFF) | "1" is set under condition of (data of the register 428) $\leq$ (data of the register 464). |
| 556 (VSPWBF) | The signal of the register 556 is set at the timing of the clock $\phi 2$. |

Now, a method of setting reference data into the reference register 470 will be described. The registers 402, 404, 406 and 410 are set at the time of the starting of the apparatus of this embodiment. Once set, the values of these registers are not altered. The data set of the register 408 is effected by a program processing operation.

The data INJD representative of the valve opening time of the fuel injector 66 is applied to the register 412. This data INJD is determined as follows by way of example. The output signal QA of the air flow meter 14 is loaded into the analog-to-digital converter 124 through the multiplexer 122. It is converted into digital data here, and is retained in a register (not shown). From the data representative of the quantity of suction air and data retained in the register 430 in FIG. 4, load data TP is evaluated by a computation processing operation or with information stored as a map. Further, the outputs of the suction temperature sensor 16, the water temperature sensor and the atmospheric pressure sensor are subjected to digital conversion, and a correction is made by the use of these data and the operating state of the engine. The coefficient of this correction is denoted by K1. The battery voltage is also digitalized, and a correction is made according to this data. The coefficient of this correction is denoted by TS. Subsequently, a correction is made with the $\lambda$-sensor 80. The coefficient of this correction is denoted by $\alpha$. That is, the data INJD becomes the following equation:

$$INJD = \alpha(K1 \cdot TP + TS)$$

Thus, the valve opening time of the fuel injector is determined. However, the method here indicated is a mere example, and the valve opening time can of course be determined by any other method.

The data ADV representative of the ignition timing is set in the register 414. This data ADV is formed as follows by way of example. Mapped ignition data $\theta$IG whose factors are the load data TP and the number of revolutions is retained in the ROM 118. A starting correction, a water temperature correction, an acceleration correction, etc. are applied to the data $\theta$IG. Thus, the data ADV is prepared.

The data DWL is set in the register 416 as data for controlling the charging time of the primary current of the ignition coil. This data DWL is calculated and obtained from the value of the data ADV and the digital value of the battery voltage.

The data EGRP representative of the period of the signal EGR and the data NIDLP representative of the period of the signal NIDL are respectively set in the registers 418 and 422. These data are determined in advance.

The data EGRD representative of the conduction width of the EGR valve (exhaust gas recirculator) is set in the register 420. As the conduction width becomes great, the valve opening proportion of the exhaust gas recirculator increases, and the recirculation rate of the exhaust gas increases. The data EGRD is retained in the ROM 118 in, for example, a mapped state whose factors are the load data TP and the revolution speed. Further, this data is corrected with the water temperature, etc.

The data NIDLD representative of the conduction width of the air regulator 48 is set in the register 424. This data is feedback-controlled so that, for example, the revolution speed of the engine in the no-load state may become a predetermined revolution speed, and it is determined as the quantity of feedback thereof.

The data RPMW and VSPW representative of fixed times are respectively set in the registers 426 and 428 when the circuit of this embodiment is started.

In the above description, the output of the air flow sensor is used as the input factor for the controls of the quantity of fuel injection, the ignition advance angle, the quantity of exhaust gas recirculation, etc. However, it is possible to employ any sensor other than the air flow sensor as a sensor representative of the state of the suction air.

For example, a pressure sensor which detects the intake manifold pressure may be employed.

According to this invention, the pulse signals which are applied irregularly with respect to the stage cycles are synchronized, so that precise detections are possible.

Further, in the foregoing embodiment, the stage cycles are divided into a major cycle and a minor cycle, so that the detection cycle can be made short with precision. Moreover, the stage for detecting the synchronized signal is contained in the construction of the minor cycle, so that a precise detection is possible even at high-speed revolutions of the engine.

According to the embodiment described above, the group of reference registers, the group of instantaneous registers and the group of comparison result holding registers are comprised, and the predetermined ones of the groups of registers are connected to the comparator circuit on the basis of the stage counter. Accordingly, there is the effect that in spite of a large number of engine control functions, the circuit arrangement is comparatively simple.

The fuel injection system of this invention has the function of determining the fuel injection-initiating timing by measuring the synchronized signal (reference signal) of the engine, and the function of controlling the quantity of fuel injection with the timer and the register which changes the unit time of the clocks thereof in dependence on the quantity of fuel injection. Therefore, even when the number of cylinders is different or the control range of the actuator is wide as in the control of the quantity of fuel injection, a good engine control is possible.

What is claimed is:

1. In a control apparatus for an internal combustion engine having:
   sensor means for producing signals representative of operating conditions of said engine;
   actuator means for controlling respective energy conversion functions of said engine in response to control signals applied thereto;
   an input/output unit coupled to receive signals produced by said sensor means and to deliver control signals to said actuator means; and
   a data processing unit, coupled to said input/output unit, for carrying out engine control data processing operations in accordance with signals produced by said sensor means and thereby generating engine control codes that are coupled to said input/output unit;
   said input/output unit comprising:
   first means for generating an engine control timing signal pattern through which respective operational events of said engine are controlled;
   second means, coupled to said first means, for generating respective engine timing codes the values of which are selectively modified by said engine control timing signal pattern;
   third means, coupled to said second means, for producing respective output signals when said respective engine timing codes define a prescribed relationship with respect to said engine control codes;
   fourth means, coupled to said third means, for producing control signals to be coupled to said actuator means in response to the output signals produced by said third means; and
   fifth means, coupled to said first means, for varying a characteristic of said engine control timing signal pattern in response to instruction data supplied by said data processing unit.

2. A control apparatus according to claim 1, wherein said characteristic corresponds to the time duration of a signal contained within said engine control timing signal pattern.

3. A control apparatus according to claim 1, wherein said characteristic corresponds to the frequency of occurrence of a signal contained within said engine control timing signal pattern.

4. A control apparatus according to claim 1, wherein said second means includes a register having a first prescribed bit capacity containing said engine timing code associated with the delivery of fuel to the engine and means for controllably changing the value of said engine timing code contained in said register in response to said engine control timing signal pattern.

5. A control apparatus according to claim 1, wherein said actuator means includes means for controlling the delivery of fuel to said engine, said second means includes means for generating an engine timing code associated with the delivery of fuel to the engine, and wherein said characteristic corresponds to a timing characteristic by way of which said engine timing code associated with the delivery of fuel to the engine is modified by said engine control timing signal pattern.

6. A control apparatus according to claim 5, wherein said fifth means includes means for varying the rate at which said engine timing code associated with the delivery of fuel to the engine is modified by said engine control timing signal pattern.

7. A control apparatus according to claim 5, wherein said engine control timing signal pattern includes a prescribed signal in response to which the engine control code associated with the delivery of fuel to the engine generated by said second means is modified, and said fifth means includes means for controlling a timing characteristic of said prescribed signal.

8. A control apparatus according to claim 7, wherein said timing characteristic corresponds to the frequency of occurrence of said prescribed signal.

9. A control apparatus according to claim 5, wherein said second means includes a register having a first prescribed bit capacity containing said engine timing code associated with the delivery of fuel to the engine and means for controllably changing the value of said engine timing code contained in said register in response to said engine control timing signal pattern.

10. A control apparatus according to claim 9, wherein said fifth means includes means for generating a prescribed code of a second prescribed bit capacity in response to said instruction data from said data processing unit, and wherein said first means includes means for generating a variable code of a third prescribed bit capacity and means responsive to said prescribed code and said variable code for generating said engine control timing signal pattern.

11. A control apparatus according to claim 10, wherein the combined bit capacity of said prescribed code and said variable code is larger than said first prescribed bit capacity.

12. In a control apparatus for an internal combustion engine having:
sensor means for producing signals representative of operating conditions of said engine;
actuator means for controlling respective energy conversion functions of said engine in response to control signals applied thereto;
an input/output unit coupled to receive signals produced by said sensor means and to deliver control signals to said actuator means; and
a data processing unit, coupled to said input/output unit, for carrying out engine control data processing operations in accordance with signals produced by said sensor means and thereby generating engine control codes that are coupled to said input/output unit in synchronism with a clock signal;
said input/output unit comprising:
first means for generating an engine control timing signal pattern through which operational events of said engine are controlled;
second means, coupled to said data processing unit, for storing said engine control codes;
third means, coupled to said first means, for generating respective engine timing codes the values of which are selectively modified by said engine control timing pattern;
fourth means, coupled to said second and third means, for comparing respective ones of said engine control codes with respective ones of said engine timing codes and producing respective output signals when said respective engine control codes define a prescribed relationship with respect to said engine timing codes;
fifth means, coupled to said fourth means, for producing control signals to be coupled to said actuator means in response to the output signals produced by said fourth means; and
sixth means, coupled to said first means, for varying a timing characteristic of said engine control timing signal pattern in response to instruction data supplied by said data processing unit.

13. A control apparatus as claimed in one of claims 1 and 12, wherein said engine control timing signal pattern is composed of a plurality of stage pulses each repeatedly generated at predetermined time intervals.

14. A control apparatus as claimed in one of claims 1 and 12, wherein said sixth means comprises means for producing plural pulse signals at various time intervals and means for producing said engine control timing signal pattern on the basis of selected pulse signals from said plural pulse signals.

15. A control apparatus as claimed in claim 13, wherein said sixth means includes means for varying the rate of occurrence of at least one stage pulse of said plural stage pulses of said engine control timing signal pattern.

16. A control apparatus as claimed in claim 15, wherein the at least one of said stage pulses is a stage pulse by way of which fuel injection time is determined.

17. A control apparatus as claimed in claim 15, wherein said sixth means comprises means for producing plural pulse signals at various time intervals and means for selecting at least one pulse signal as said at least one stage pulse from said plural pulse signals in accordance with said instruction data from said data processing unit.

18. A control apparatus as claimed in claim 17, wherein said selecting means comprises register means for converting said instruction data from said data processing unit into a plurality of binary signals and logical circuit means for logically selecting the one pulse signal from said plural pulse signals produced by said plural pulse signal producing means.

19. A control apparatus as claimed in claim 18, wherein said selecting means further comprises plural inverter means each receiving the plurality of said binary signals, and said logical circuit means includes means for selecting the one pulse signal from said plural pulse signals in accordance with the combination of the plurality of said binary signals from said register means.

20. A control apparatus as claimed in claim 17, wherein said plural pulse signal producing means comprises means for producing a pulse signal at a predetermined time interval and means for producing plural pulse signals having various time intervals, and said selecting means comprises means for generating a stage pulse when both said pulse signal at the predetermined time interval and the selected one of said plural pulse signals occur simultaneously.

21. A control apparatus as claimed in claim 20, wherein said predetermined time interval pulse signal producing means comprises counter means for counting up a clock signal produced in response to a clock signal coupled from said data processing unit.

22. A control apparatus as claimed in claim 20, wherein said first means comprises a binary counter having an input, to which a clock signal produced in response to the clock from said data processing unit is supplied, and having a prescribed bit capacity made up of a plurality of bits, a part of which are adapted to operate as said predetermined time interval pulse signal producing means and the remainder of which are adapted to operate as said various time interval pulse producing means.

23. A control apparatus as claimed in claim 22, wherein said predetermined time interval pulse signal producing means further comprises means for generating said predetermined time interval pulse signal when all the bits which are adapted to operate as said predetermined time interval pulse signal producing means have prescribed binary states.

24. A control apparatus as claimed in claim 22, wherein the bit capacity of said binary counter is seven, three bits of which are adapted to operate as said predetermined time interval pulse signal producing means and four bits of which are adapted to operate as said various time interval pulse signal producing means.

25. A control apparatus as claimed in claim 18, wherein said register means produces three binary signals in response to said instruction data from said data processing unit.

26. A control apparatus as claimed in claim 15, wherein said time interval varying means includes means for varying the rate of occurrence of said one stage pulse in such manner that the rate of occurrence is divided by $2^0$ when the content of said instruction data from said data processing unit is "0", that the rate of occurrence is divided by $2^1$ when the content of said instruction data is "1", that the rate of occurrence is divided by $2^2$ when the content of said instruction data is "2", that the rate of occurrence is divided by $2^3$ when the content of said instruction data is "3", and that the rate of occurrence is divided by $2^4$ when the content of said instruction data is "4".

27. A control apparatus as claimed in claim 26, wherein the period of said one stage pulse is 8μ seconds.

28. A control apparatus according to claim 12, wherein said actuator means include means for supplying fuel to said engine and said sensor means include rotation sensor means for generating pulses in accordance with the rotation of a crankshaft of said engine, and wherein
   said second means includes means for storing a first prescribed engine control code representative of a prescribed angular rotation of said crankshaft between a predetermined angular position of said crankshaft and the angular position of said crankshaft at which said rotation sensor means produces a prescribed reference pulse, and
   said fourth means includes means for producing an output signal for controlling the supply of fuel to said engine by said fuel supply means upon a first of said engine timing codes generated by said third means reaching a value corresponding to said first prescribed engine control code.

29. A control apparatus according to claim 28, wherein said second means includes means for storing a second prescribed engine control code representative of the number of cylinders of said engine, and
   said fourth means includes means for producing an output signal for initiating the supply of fuel to said engine upon a second of said engine timing codes generated by said third means reaching a value corresponding to said second prescribed engine control code.

30. A control apparatus according to claim 29, wherein said sixth means includes means for varying the rate at which said second engine timing code is selectively modified by said engine control timing signal pattern.

31. A control apparatus according to claim 30, wherein
   said second means includes means for storing a third prescribed engine control code representative of the duration of the supply of fuel to said engine, and
   said fourth means includes means for producing an output signal for terminating the supply of fuel to said engine upon a third of said engine timing codes generated by said third means reaching a value corresponding to said third prescribed engine control code.

32. A control apparatus according to claim 31, wherein
   said second means includes means for storing a fourth prescribed engine control code representative of the degree of rotation of said crankshaft measured from the angular position of said crankshaft at which the value of said first engine timing code corresponds to said first prescribed engine control code to the angular position of said crankshaft at which primary current flow in an ignition coil produced as part of said ignition control means is cut-off, and
   said fourth means includes means for producing an output signal for controlling the ignition of fuel supplied to said engine upon a fourth of said engine timing codes generated by said third means reaching a value corresponding to said fourth prescribed engine control code.

33. A control apparatus according to claim 32, wherein
   said second means includes means for storing a fifth prescribed engine control code representative of the degree of rotation of said crankshaft measured from the angular position of said crankshaft at which the value of said fourth engine timing code reaches a value corresponding to said fourth prescribed engine control code to the angular position of said crankshaft at which primary current flow in said ignition coil is initiated, and
   said fourth means includes means for producing an output signal for defining the duty cycle of the signal for controlling the ignition of fuel supplied to said engine upon a fifth of said engine timing codes generated by said third means reaching a value corresponding to said fifth prescribed engine control code.

34. A control apparatus according to claim 30, wherein said third means comprises
   a plurality of storage devices for storing respective engine timing codes, and
   means, coupled to said plurality of storage devices, for controllably modifying the engine timing codes in accordance with said engine control timing signal pattern.

35. A control apparatus according to claim 34, wherein said controllably modifying means comprises
   means for selectively incrementing the data value of a respective engine timing code by a prescribed value in response to receipt of a respective portion of said engine control timing signal pattern that is associated with that engine timing code.

36. A control apparatus according to claim 35, wherein said incrementing means comprises
   means for temporarily storing the engine timing code stored by each respective one of said storage devices, and
   means for receiving the engine timing code from said temporarily storing means and selectively incrementing the data value of said code and causing the engine timing code stored in said respective one of said storage devices to be replaced by said code the data value of which has been selectively incremented.

37. A control apparatus according to claim 34, wherein said fifth means includes
   a first plurality of storage means for selectively storing the respective output signals produced by said fourth means; and
   a second plurality of storage means, coupled to the respective ones of said first plurality of storage means, for receiving and storing the output signals stored by said first plurality of storage means.

38. A control apparatus according to claim 37, wherein said controllably modifying means includes means, coupled to said fifth means, for controllably modifying the engine timing codes stored in said plurality of storage devices in dependence upon the output signals stored in said second plurality of storage means.

39. A control apparatus according to claim 38, wherein said fifth means further includes means for causing a respective storage means of said first plurality of storage means to store a respective output signal produced by said fourth means during a first interval of time and thereafter causing a corresponding respective storage means of said second plurality of storage means to receive and store said respective output signal stored in said respective storage means of said first plurality of storage means during a second interval of time subsequent to said first interval of time.

40. An improved control apparatus according to claim 39, wherein said controllably modifying means comprises
  means for selectively incrementing the data value of a respective engine timing code by a prescribed value in response to receipt of a respective portion of said engine control timing signal pattern that is associated with that engine timing code.

41. A control apparatus as claimed in claim 30, wherein said sixth means comprises means for producing plural pulse signals at various time intervals and means for producing said engine control timing signal pattern on the basis of selected pulse signals from said plural pulse signals.

42. A control apparatus as claimed in claim 41, wherein said sixth means includes means for varying the rate of occurrence of at least one stage pulse of said plural stage pulses of said engine control timing signal pattern.

43. A control apparatus as claimed in claim 42, wherein said sixth means comprises means for producing plural pulse signals at various time intervals and means for selecting at least one pulse signal as said at least one stage pulse from said plural pulse signals in accordance with said instruction data from said data processing unit.

44. A control apparatus as claimed in claim 17, wherein said selecting means comprises register means for converting said instruction data from said data processing unit into a plurality of binary signals and logical circuit means for logically selecting the one pulse signal from said plural pulse signals produced by said plural pulse signal producing means.

45. A control apparatus as claimed in claim 31, wherein said third means includes means for preventing further modification of said third engine timing code stored by said second means in response to said fourth means producing said output signal for terminating the supply of fuel to said engine.

* * * * *